United States Patent [19]

Ikenaga et al.

[11] Patent Number: 5,388,235
[45] Date of Patent: Feb. 7, 1995

[54] ARITHMETIC AND LOGIC PROCESSOR AND OPERATING METHOD THEREFOR

[75] Inventors: Chikako Ikenaga; Hideki Ando, both of Hyogo, Japan

[73] Assignee: Mitsubishi Denki Kabushiki Kaisha, Tokyo, Japan

[21] Appl. No.: 83,759

[22] Filed: Aug. 16, 1993

Related U.S. Application Data

[63] Continuation of Ser. No. 530,700, May 30, 1990, Pat. No. 5,276,820.

[30] Foreign Application Priority Data

Jul. 5, 1989 [JP] Japan .................................. 1-174875

[51] Int. Cl.⁶ ........................ G06F 13/00; G06F 9/00
[52] U.S. Cl. ............................ 395/375; 364/DIG. 1;
364/244.3; 364/245; 364/247; 364/247.2;
364/247.6; 364/258; 364/259.2; 364/260;
364/260.1; 364/260.6; 364/259.9; 364/268.4;
395/775
[58] Field of Search ............. 395/375, 425, 325, 650,
395/800, 775, 700

[56] References Cited

U.S. PATENT DOCUMENTS

| | | | |
|---|---|---|---|
| 4,112,495 | 9/1978 | Easley | 395/375 |
| 4,287,559 | 9/1981 | Easley et al. | 395/375 |
| 4,445,173 | 4/1984 | Pilat et al. | 395/375 |
| 4,733,346 | 3/1988 | Tanaka | 395/325 |
| 4,734,852 | 3/1988 | Johnson et al. | 395/250 |
| 4,739,471 | 4/1988 | Baum et al. | 395/375 |
| 4,740,916 | 4/1988 | Martin | 395/425 |
| 4,747,046 | 5/1988 | Baum et al. | 395/375 |
| 4,777,588 | 10/1988 | Case et al. | 395/800 |
| 4,811,208 | 3/1989 | Myers et al. | 395/800 |
| 4,833,640 | 5/1989 | Baba | 395/650 |
| 4,878,166 | 10/1989 | Johnson et al. | 395/425 |
| 4,891,753 | 1/1990 | Budde et al. | 395/375 |
| 4,901,233 | 2/1990 | Liptay | 395/375 |
| 4,947,366 | 9/1990 | Johnson | 395/275 |
| 4,969,091 | 11/1990 | Muller | 395/775 |
| 5,023,828 | 6/1991 | Grundmann et al. | 395/375 |
| 5,050,067 | 9/1991 | McLagan et al. | 395/700 |
| 5,079,771 | 1/1992 | Shimeda | 371/43 |
| 5,083,263 | 1/1992 | Joy et al. | 395/425 |
| 5,107,457 | 4/1992 | Hayes et al. | 395/800 |
| 5,155,821 | 10/1992 | Sone et al. | 395/375 |

OTHER PUBLICATIONS

Joan M. Pendleton et al., "A 32-bit Microprocessor for Smalltalk", *IEEE Journal of Solid-State Circuits*, vol. SC-21, No. 5, Oct. 1986.

Yuval Tamir et al., "Strategies for Managing the Register File in RISC", *IEEE Transactions on Computers*, vol. C-32, No. 11, Nov. 1983, pp. 977-989.

Robert W. Sherburne Jr. et al., "A 32-Bit NMOS Microprocessor with a Large Register File", *IEEE Journal of Solid-State Circuits*, vol. SC-19, No. 5, Oct. 1984, pp. 682-686.

John L. Rynearson, "Register Windows Unleash RISC For Real-Time Systems", *Computer Design*, vol. V28, Nov. 13, 1989.

Brian Case, "Understanding of SPARC Architecture", *Microprocessor Report*, vol. v4, Dec. 26, 1990.

*Primary Examiner*—Jack B. Harvey
*Assistant Examiner*—Ayaz R. Sheikh
*Attorney, Agent, or Firm*—Lowe, Price, LeBlanc & Becker

[57] ABSTRACT

An arithmetic and logic processor includes a register file structure wherein each procedure to be processed has assigned thereto a predetermined number of registers referred to as register window. The processor further includes circuitry for comparing a predetermined constant LENGTH with the difference between the register window currently utilized by a procedure under execution and the base address of the register file, and circuitry responsive to the comparing circuitry output to detect when data should be transferred on a window basis to or from the register file from or to a stack memory for saving the register file contents, and circuitry responsive to the decision circuitry output to perform data transfer between the register file and the stack memory. According to such circuitry, overflow and underflow of the register file can be greatly suppressed to improve processing speed of the processor.

15 Claims, 12 Drawing Sheets

PROCEDURE CALL. PARAMETERS ARE USUALLY DELIVERED TO THE SUBROUTIN WHILE STORED IN A MEMORY

REGISTER FILE

STACK

FIG.15

| STATUS | CONDITION | OUTPUT | NEXT STATUS |
|---|---|---|---|
| INITIAL $(S_2,S_1,S_0)=(000)$ | !CALL !RETURN CW-RFB>LENGTH | SET-$S_0$ SET-$S_2$ | STORE |
| | !CALL !RETURN CW-RFB<LENGTH | SET-$S_1$ SET-$S_2$ | LOAD |
| | CALL | CW++ SET-$S_0$ | CALL TRAP DECISION |
| | RETURN | CW-- SET-$S_1$ | RETURN TRAP DECISION |
| DECISION ON CALL TRAP $(S_2,S_1,S_0)=(001)$ | CW!=RFB | RESET-$S_0$ | INITIAL |
| | CW==RFB STW!=RFB | RSW++ RFB++ IWC=WINDOW-SIZE RP=RSW RESET-$S_0$ | INITIAL |
| | CW==RFB STW==RFB | CALL-TRAP-START : CALL TRAP SET-$S_1$ | |
| DECISION ON RETURN TRAP $(S_2,S_1,S_0)=(010)$ | CW!=RFB CW>STW | RESET-$S_1$ | INITIAL |
| | CW!=RFB CW==STW | SWC=0 ST=SWT RESET-$S_1$ | INITIAL |
| | CW!=RFB CW<STW | SWT-- STW-- ST=SWT RESET-$S_1$ | INITIAL |
| | CW==RFB | RETURN-TRAP-START : RETURN RESET-$S_1$ TRAP SET-$S_2$ | |
| CALL TRAP $(S_2,S_1,S_0)=(011)$ | !CALL-TRAP | RESET-$S_0$ RESET-$S_1$ | INITIAL |
| RETURN TRAP $(S_2,S_1,S_0)=(100)$ | !RETURN-TRAP | RESET-$S_2$ | INITIAL |
| STORE $(S_2,S_1,S_0)=(101)$ | !USE-MEM CW!=STW SWC!=WINDOW-SIZE | PUSH WORD SWC++ ST++ | INITIAL |
| | SWC=WINDOW-SIZE | SWC==0 STW++ SWT++ | INITIAL |
| LOAD $(S_2,S_1,S_0)=(110)$ | !USE=MEM IWC!=0 | IWC-- RP-- POP-WORD | INITIAL |
| | IWC==0 | IWC=WINDOW-SIZE RFB-- RSW-- | INITIAL |

FIG.16

| OUTPUT | INPUT |
|---|---|
| SET-S0 | = !S0 !S1 !S2(!CALL !RETURN CW-RFB>LENGTH+CALL) |
| SET-S1 | = !S0 !S1 !S2(!CALL !RETURN CW-RFB<LENGTH+RETURN) |
| SET-S2 | = +S0 !S1 !S2 CW==RFB STW=RFB<br>!S0 !S1 !S2 (!CALL !RETURN CW-RFB>LENGTH<br>+!CALL !RETURN CW-RFB<LENGTH)+!S0 S1 !S2 CW==RFB |
| RESET-S0 | = S0 !S1 !S2(CW!=RFB+CW==RFB STW!=RFB)<br>+S0 S1 !S2 !CALL TRAP |
| RESET-S1 | = !S0 S1 !S2 +S0 S1 !S2 !CALL-TRAP |
| RESET-S2 | = !S0 !S1 S2 !RETURN-TRAP |
| PUSH-WORD | = !S0 !S1 !S2 CW!=STW !USE-MEM(SWC!=WINDOW-SIZE) |
| POP-WORD | = !S0 !S1 !S2 !USE-MEM IWC!=0 |
| CW++ | = !S0 !S1 !S2 CALL |
| CW-- | = !S0 !S1 !S2 RETURN |
| STW++ | = !S0 !S1 !S2 (SWC==WINDOW-SIZE) |
| STW-- | = !S0 !S1 S2 CW<STW CW!=RFB |
| RFB++ | = !S0 !S1 !S2 CW==RFB STW!=RFB |
| RFB-- | = !S0 !S1 S2 IWC==0 |
| SWT++ | = !S0 !S1 !S2 !CALL !RETURN WC=WINDOW-SIZE |
| SWT-- | = S0 !S1 !S2 CW<STW CW!=RFB |
| RSW++ | = S0 !S1 !S2 CW==RFB STW!=RFB |
| RSW-- | = S0 !S1 S2 IWC==0 |
| SWC++ | = !S0 !S1 S2 !USE-MEM CW!=STW SWC!=WINDOW-SIZE |
| SWC=0 | = !S0 S1 !S2 CW!=RFB CW==STW+S0 !S1 S2 SWC==WINDOW-SIZE |
| IWC-- | = !S0 S1 !S2 !USE-MEM IWC!=0 |
| IWC=WINDOW-SIZE | = S0 !S1 !S2 CW==RFB STW!=RFB+!S0 S1 S2 IWC==0 |
| ST++ | = S0 !S1 !S2 CW!=STW SWC!=WINDOW-SIZE !USE-MEM |
| ST=SWT | = !S0 !S1 !S2 CW!=RFB(CW==STW+CW<STW) |
| RP=RSW | = S0 !S1 !S2 CW==RFB STW!=RFB |
| RP-- | = !S0 S1 S2 !USE-MEM IWC!=0 |
| CALL-TRAP-START | = S0 !S1 !S2 CW==RFB |
| RETURN-TRAP-START | = !S0 S1 !S2 CW==RFB |

THE SYMBOL OF LOGICAL PRODUCT IS OMITTED, +:LOGICAL SUM, !:NEGATE

ARITHMETIC AND LOGIC PROCESSOR AND OPERATING METHOD THEREFOR

This application is a continuation of application Ser. No. 07/530,700 filed May 30, 1990 U.S. Pat. No. 5,276,820.

BACKGROUND OF THE INVENTION

1. Field of the Invention

The present invention relates to an arithmetic and logic processor such as a computer, and more particularly to a reduced instruction set computer.

2. Description of the Background Art

As one architecture of a VLSI (very large scale integrated circuit) processor, there is a scheme called reduced instruction set computer (hereinafter referred to as "RISC"). The RISC is a computer where among an instruction set of a computer in prior art, only basic instructions being high in the use frequency use are prepared through hardware implementation for high speed of the data processing. Various features of the RISC can be mentioned, and according to D. A. Patterson et al. in the article of "AVLSI RISC COMPUTER", IEEE, Computer, Vol. 15, No. 9, Sept. 1982, pp. 8 to 22, the features are as follows:
(1) one-cycle instruction
(2) fixed length instruction format
(3) load/store architecture
(4) wired logic control
(5) overlap register window
(6) optimization of a pipeline by a compiler The specific architecture of the RISC is described in detail in the above-mentioned reference. Now, the architecture of the RISC will be briefly explained.

In the RISC, in order to realize high speed processing, arithmetic or logic operation is limited between registers and the execution thereof is done within one cycle basically. In the RISC, since only the basic instructions being high in the use frequency use are prepared, constitution of internal control circuitry is simplified and margin is provided in the chip area. A register file is installed on the chip having the margin. A general-purpose register of the register file is used as the register for the operation. Only the load/store instruction is related to accessing to a memory. The instruction format is shown in FIGS. 1A through 1E.

Referring to FIG. 1A, the instruction format of standard type will be described. Any of the instruction format of standard type is set to have a constant bit length (for example, 32 bits), and includes an instruction code (7 bits) designating an operation content, SCC bit indicating whether a condition code (overflow, carry bit, zero bit, negative bit, extension bit or the like) is set or not, destination (5 bits) indicating the data transfer destination, a source 1 region (5 bits) designating the register being the data transfer source, an immediate instruction (constant or the like) IMM, and a source 2 region (13 bits) specifying any of a source register, an immediate and an offset.

When the IMM bit is "0", the instruction format is for an inter-register instruction, as shown in FIG. 1B. In this case, destination Rd selects one of the registers assigned to a procedure under execution as the transfer destination of the result of an operation executed in the registers specified by the sources Rs and S2. In the case that IMM is "0", the lower 5 bits of the source 2 region, S2, gives the information specifying a register.

When the IMM is "1", the instruction format is for an immediate instruction as shown in FIG. 1C. In this case, the source S2 represents a signed constant.

For an instruction requiring a memory access (memory access instruction) as shown in FIG. 1D, the bits S1 of the source 1, i.e., Rx specify an index register, and the bits S2 of the source 2 specify an offset. In this case, the destination register Rd or the source register Rm during storage operation is specified as the destination. Consequently, as the addressing mode the register indirect mode is mainly employed.

In the case of the relative jump instruction as shown in FIG. 1E, bits of the source 1, the IMM and the source 2 are combined, and specify the branch destination by using the combination as Y bits to specify a relative address of 19 bits, for example, of a program counter.

In the RISC as above described, only necessary basic instructions being high in the use frequency use are prepared, and each instruction word as shown in FIGS. 1A through 1E is unified to a fixed length of 32 bits for example, and each instruction is executed in one cycle. Consequently, constitution of the control system is simplified and the chip occupied area is significantly decreased.

An advanced control is adopted in the RISC, wherein prefetch of an instruction and execution of an instruction are overlapped in every cycle. In the advanced control of the RISC, the execution cycle of loading of two operands from general-purpose registers, the execution of operation and the store of an operation result in a general-purpose register is realized by a wired logic.

The RISC assumes programming by a high-level language. Since a structured programming with a high-level language is popularly used, the number of modules for constituting a program becomes large. As a result, times of the execution of a procedure read instruction increase. Since a complicated instruction is excluded in the RISC, when the same function as that of such complicated instruction is required, a subroutine is used. Such method causes increase of the number of procedure call.

The procedure call is performed usually by the steps as shown in FIG. 2. When some procedure calls a subroutine (SUB), if a parameter PARA must be transferred to the called procedure (SUB), memory access is necessary. In this case, the storage address of a parameter to be delivered to the called procedure (SUB) is designated by an instruction DCA (PARA), and the parameter PARA is stored in the locations starting at the storage address. A memory access requires a longer time than that of an access to a register. In order to decrease the overhead, constitution of overlap register window is generally employed in the RISC. The overlap register window will now be described.

In the RISC, a number of general-purpose registers are installed, and a prescribed number of registers among the general-purpose registers are assigned to each procedure. A register group assigned to a procedure is called a register window.

FIG. 3A shows a constitution example of a register window which can be accessed by one procedure. The register window includes global registers at logic register numbers R0–R7, low registers at logic register numbers R8–R15, local registers at logic register numbers R16–R23, and high registers at logic register numbers R24–R31. The global registers store global variables used commonly in all procedures. The low registers and the high registers are regions where parameters are transmitted and received between procedures. The local registers are registers which an associated procedure uses dedicatedly. Now, operation will be described in the case that procedure A is executed and calls procedure B, and subsequently the procedure B calls procedure C as shown in FIG. 3B.

FIG. 4A shows specific constitution of a register file. As shown in FIG. 4A, the register file is constituted by global register regions of physical register numbers 0-7 and local register regions of physical register numbers 8-119. The local register regions of physical register numbers 8-119 are divided into unit regions (window) each comprising low register region, local register region and high register region, and a divided region unit is assigned to a procedure. Now assume that procedure A shown in FIG. 3B is under execution and uses the register file in the regions of the physical addresses (physical register number) 0-7 as global registers and the physical addresses 8-31 as local registers. When the procedure A calls procedure B, the procedure A stores arguments (parameter p1, . . . p6) to the register file (high a) of the addresses 24-31 and then calls the procedure B. The called procedure B uses the register file in the addresses 0-7 as global registers and the addresses 24-47 as local registers. Subsequently when the procedure B calls procedure C, the procedure B stores arguments (q1, . . . Q6) to the registers of the numbers (address) 40-47 and then calls the procedure C. The called procedure C uses the register file in the addresses 0-7 as global registers and the addresses 40-63 as local registers. That is, explaining the procedure B as an example, as shown in FIG. 4B, the high registers R24-R31 used by the procedure B are physically the same as the local registers R8-R15 used by the procedure C. Also the low registers R8-R15 used by the procedure B are physically the same as the high registers R24-R31 used by the procedure A. The transfer of parameters between the procedures can be performed on the registers being made physically the same. Consequently, the parameters need not be transferred to the memory, and the procedure can be called at high speed.

In the RISC as described above, when a procedure call occurs, save of a calling environment using a stack formed on the memory is not performed, but processing of the call is performed merely by moving of the register window. Moreover since the register window is partially overlapped, the overlapped part is used as registers for arguments to be delivered between procedures. In the example shown in FIG. 4B, the addresses 24-31 are commonly used by the procedure A and the procedure B, and a calling procedure stores the argument therein.

Return from a procedure is performed similarly, and the arguments for the return are stored in the overlapped part at the lower side of the register window, and subsequently the register window is moved towards the lower address. That is, for example, in the case of return from the procedure B to the procedure A, the argument for the return is stored in the low registers R8-R15 of the procedure B, and subsequently the register window is moved to regions of the addresses 8-31 of the register file. Thereby the return to the procedure A is performed.

As described above, in the call/return of the procedure, the transmission/reception of the parameters can be performed without accessing to the memory so that the call/return of a procedure can be performed at high speed. In the RISC, such call/return processing is supported by hardware, providing higher speed processing.

In the RISC also, the advanced control for processing the execution of instructions in pipeline is used often. Since the instruction word length or the instruction cycle is made uniform, the advanced control as shown in FIG. 5 is realized using a simple circuit constitution. That is, the prefetch of instruction, the instruction decode and the instruction execution are performed in an overlapping fashion. In general, a write cycle is performed after an execute cycle, and the operation result is stored in a register. However, the write cycle is omitted in the figure. In the advanced control, an execution cycle such as the load of two operands from the general-purpose registers, the execution of operation thereon and the store of the operation result in a general-purpose register is realized in a wired logic.

In the register file constitution shown in FIG. 4A, 120 general-purpose registers are prepared, and therefore six window registers can be installed. Consequently the overhead in saving a calling environment to the stack is not produced in the computer before the sixth procedure call. However, if the procedure call is produced six times or more, since an empty file does not exist in the register file, any save operation becomes necessary. When the call of the procedure becomes deep and is beyond the register file, a trap is usually generated. Data overflowing from the register file is saved to the memory by an OS (operating system). That is, in the RISC, when the register file is filled up and the register windows cannot be further produced (this state is called overflow of the register file), the trap routine for saving the oldest register window to the memory is started.

Even when the procedure return is produced, the case may occur that corresponding window does not exist in the register file (this state is called underflow of the register file), due to the saving of the register window to the memory. Also in this case, the trap routine for restoring the register window from the memory is started. In the starting of the trap, for example, a register monitoring the usage condition of the register windows is installed in a dedicated register. When the bit in that register is "1" indicating that the register window to be used next is being used, the routine of overflow trap or underflow trap is started and the save/load of the contents of the registers is performed.

In general, a memory has a slow operation speed in comparison to a CPU (central processing unit) of a computer. Consequently, in the RISC, when the overflow or the underflow of the register file occurs, the performance comparative to that of a conventional computer can be merely obtained due to the save of the variables (arguments) and the restore processing. That is, the high speed operation ability as one feature of the RISC is deteriorated. In general, the RISC is made on VLSI, in the case of VLSI, decrease of the chip size contributes to reduction of the cost. On the other hand, in order to prevent the overflow or the underflow of the register file, as many registers as possible must be installed on the chip. That is, the reduction of the cost and the improvement of the performance are in the relation of trade-off.

SUMMARY OF THE INVENTION

An object of the invention is to provide an improved arithmetic and logic processor wherein disadvantages in an arithmetic and logic processor such as RISC in the prior art are eliminated.

Another object of the invention is to provide a RISC with high performance and low price.

Still another object of the invention is to provide an arithmetic and logic processor wherein even a register file of small size can perform data processing an high speed.

Further object of the invention is to provide an arithmetic and logic processor having a function that generation of overflow and underflow can be suppressed without increasing size of the register file.

Still further object of the invention is to provide a RISC wherein generation frequency of overflow and/or underflow of the register file is reduced.

Further another object of the invention is to provide a processing method wherein the generation frequency of overflow and/or underflow of the register file is reduced.

Still further another object of the invention is to provide a processing method wherein even if call/return of a procedure beyond physical scale of the register file occurs in the RISC having the register window, the procedure can be processed at high speed.

An arithmetic and logic processor according to the invention includes means for taking difference between the start address of the register window used by the procedure under execution and the top address of the register file and for comparing the difference with a predetermined constant, means responsive to the output of the comparing means for deciding whether or not the data transfer is performed in window unit between the register file and a memory, and means responsive to the output of the deciding means for performing the data transfer in window unit between the register file and the memory.

A processing method according to the invention includes in the arithmetic and logic processor having the register window architecture where a prescribed number of general-purpose registers are assigned to each procedure, the steps of monitoring difference between the start address of the register window (physical register address) used by the procedure under execution and the top address of the register file (physical register file), comparing the monitored difference with a predetermined constant, deciding in response to the comparison result whether or not the data is transferred in window unit between the register file and a memory, and in response to the decision result, performing the data transfer in window unit between the register file and the memory.

A stack memory is used as the memory for performing the data transfer with the register file, and the save/load of the register content upon generation of overflow/underflow is performed in the form of last-in first-out.

In the above-mentioned constitution of the arithmetic and logic processor, the comparing means generates a signal indicating whether or not the overflow and/or the underflow can occur in the register file. Based on the comparing signal, the deciding means performs decision regarding whether or not the data transfer must be performed between the register and the memory. When the deciding means decides that such data transfer must be performed, the transfer means performs the data transfer in window unit between the register and the memory. Depending on conditions such as the access to the register file and use of an external bus, the register window used by the procedure called in the past is saved to the memory before the overflow of the register file is produced, and the register window saved to the memory is restored from the memory to the register before producing of the underflow. Consequently, since the possibility is high that saving the register window to the memory was already performed in a deep procedure call, the overflow in the register file is not liable to occur. Also when there is empty area in the register file, since possibility is high that the register window saved to the memory is restored to the register, the underflow of the register file is not liable to occur. Thereby the deterioration of the performance of the arithmetic and logic processor due to the overflow and/or the underflow can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a diagram illustrating in a table the state transition in an arithmetic and logic processor according to an embodiment of the invention;

FIG. 16 is a diagram illustrating in a table logic relation of input/output signals of the control logic circuit shown in FIG. 14.

DESCRIPTION OF THE PREFERRED EMBODIMENTS

Figure 1A:
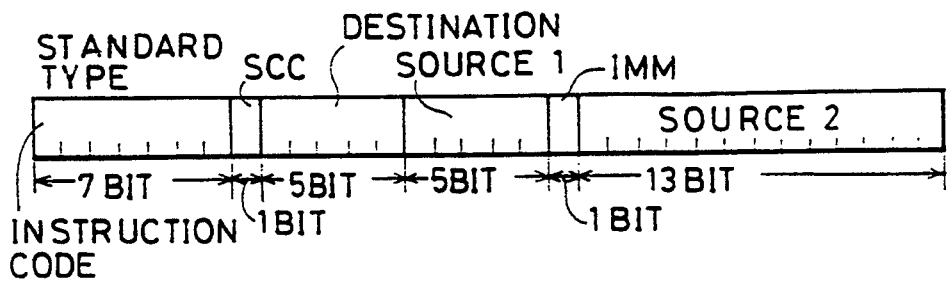
FIGS. 1A through 1E are diagrams illustrating an example of instruction formats of a RISC.
Figure 1B:
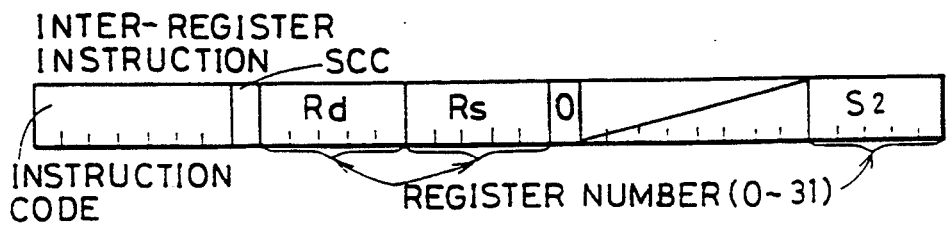
Figure 1C:
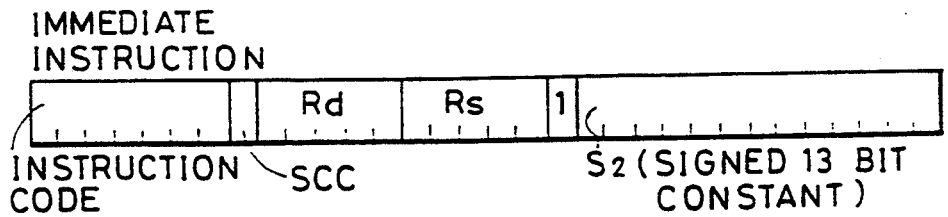
Figure 1D:
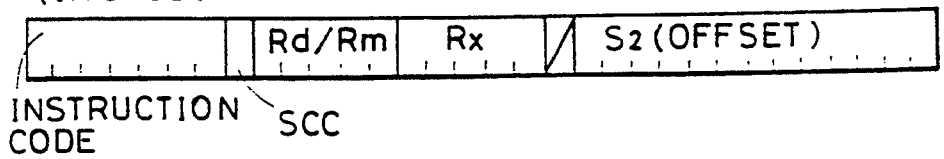
Figure 1E:
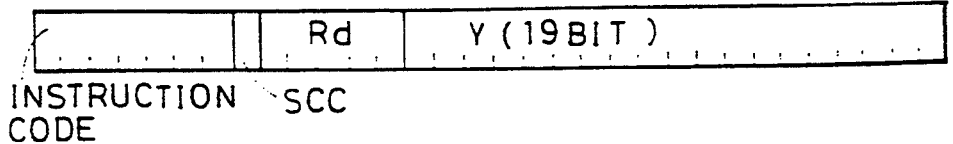
Figure 2:
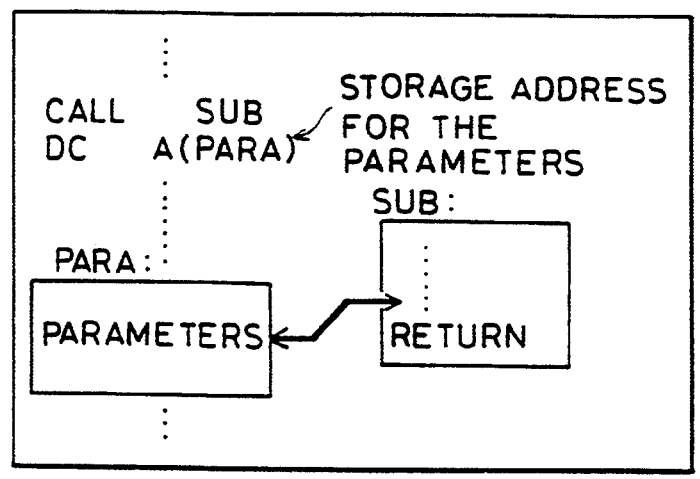
FIG. 2 is a diagram schematically illustrating transfer of a parameter in procedure call in an arithmetic and logic processor in the prior art.
Figure 3A:
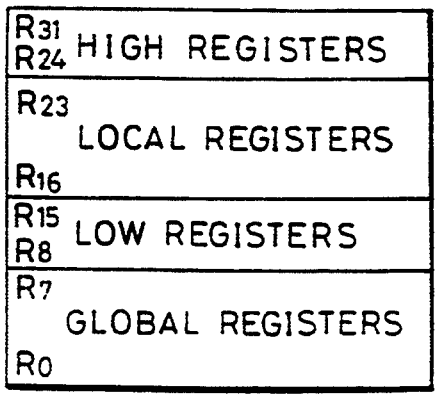
FIG. 3A is a diagram illustrating constitution of a register window assigned to one procedure.
Figure 3B:
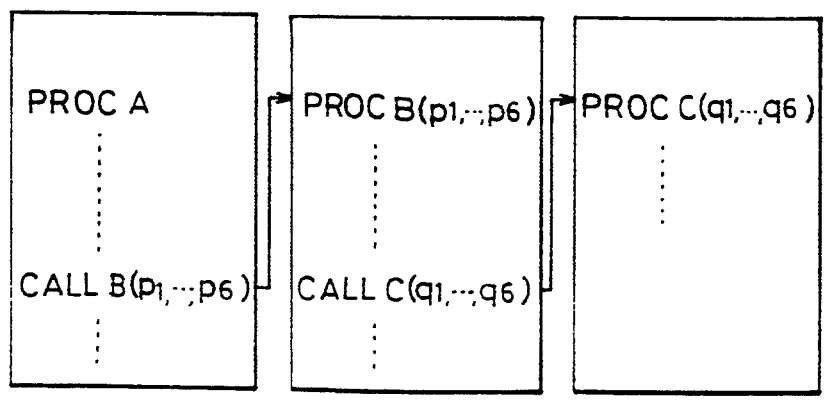
FIG. 3B is a diagram schematically illustrating operation when procedure call is performed.
Figure 4A:
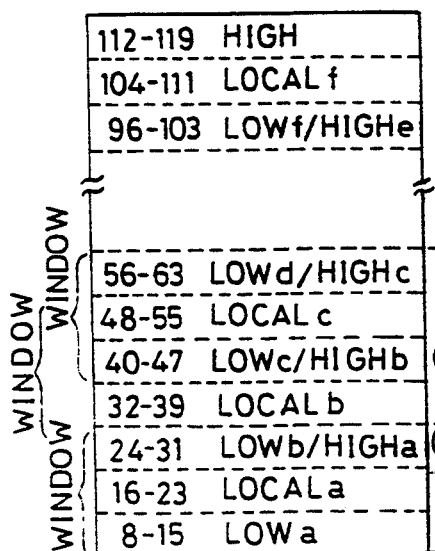
FIGS. 4A and 4B are diagrams illustrating structure of a register file and movement of register windows in a procedure call.
Figure 4B:
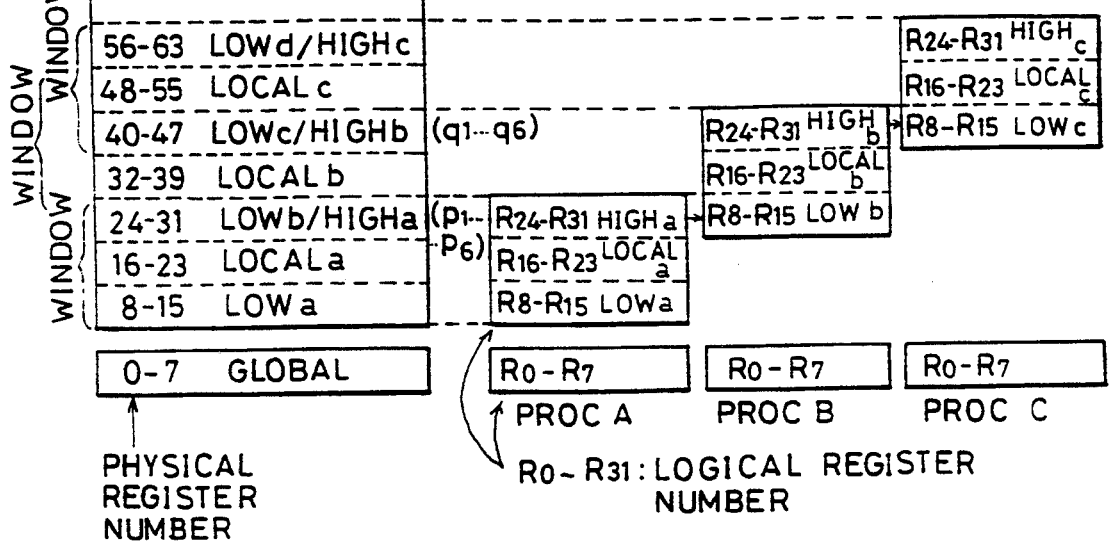
Figure 6:
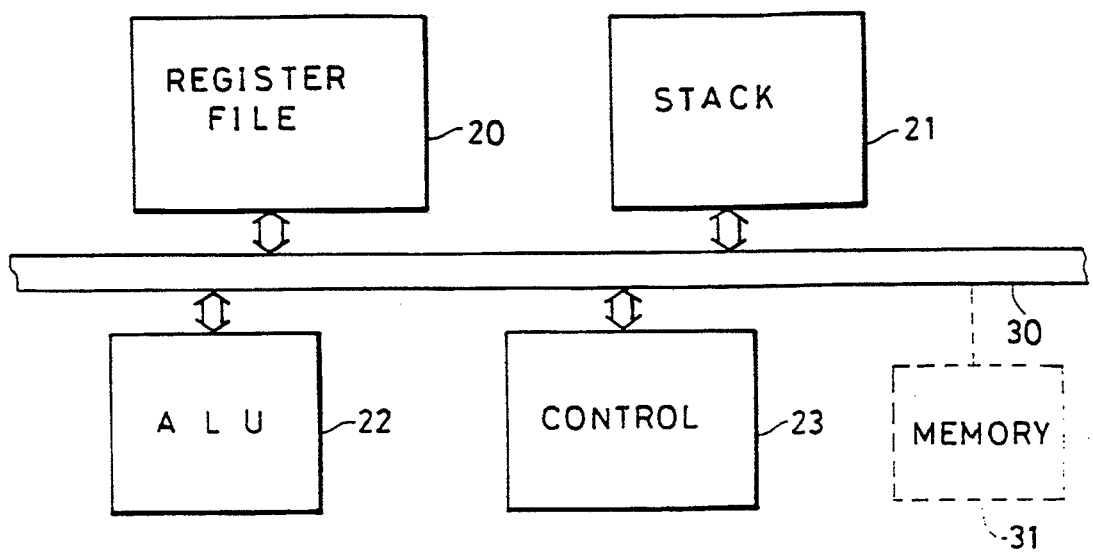
FIG. 6 is a diagram illustrating schematic overall constitution of an arithmetic and logic processor to which the invention is applied.

FIG. 6 shows a schematic constitution of a RISC to which the invention is applied. Referring to FIG. 6, the RISC comprises a register file 20 constituted by general-purpose registers, a stack memory 21, an arithmetic unit 22 and a control unit 23. The register file 20 has register window structure as shown in FIG. 4A. The stack memory 21 stores data of the register file 20 in window unit. The arithmetic unit 22 performs operations designated by instructions on received data. The arithmetic unit 22 performs arithmetic processing only to data stored in the general-purpose registers in the register file 20, and stores the processing result in a register in the register file 20.

The control unit 23 performs control for the transfer of data, transmission/reception of data to the outside of the processor, designation of an operation content in the arithmetic unit or the like. Execution of each control is realized, for example, by wired logic.

The register file 20, the stack memory 21, the arithmetic unit 22 and the control unit 23 are interconnected to an internal bus 30.

In the constitution shown in FIG. 6, although the stack memory 21 to store register windows is installed within the processor, the stack memory 21 may be installed outside of the processor. Although a memory to be accessed by store or load instruction is shown by a broken line block 31 in FIG. 6, the memory 31 may be installed either inside or outside of the processor.

Figure 5:
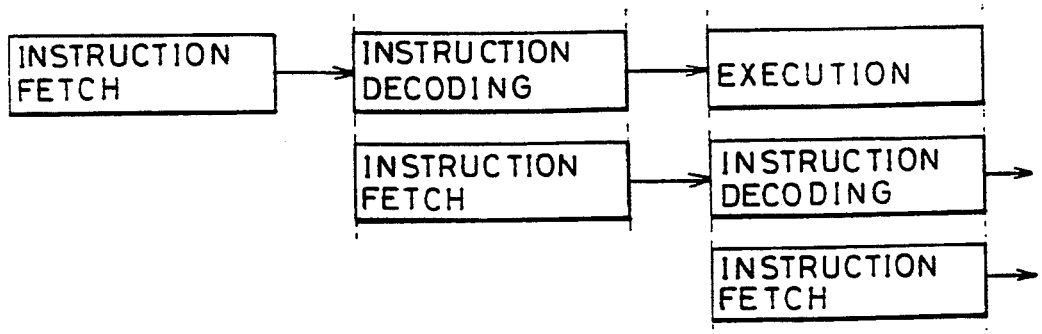
FIG. 5 is a diagram illustrating pipeline operation in an arithmetic and logic processor.

In the RISC, as shown in FIG. 5, processing operation in pipeline is intended by advanced control. In the pipeline operation, the first stage is an instruction fetch stage where fetch of instruction from the outside is performed. The second stage is an instruction decode stage where decode of given instruction is performed. The third state is an execution stage where ALU operation, load, store or calculation of branch target in accordance with the decoded instruction is performed. In general, a WRITE stage is provided as the fourth stage, and the pipeline processing including the WRITE stage is performed.

Figure 7:
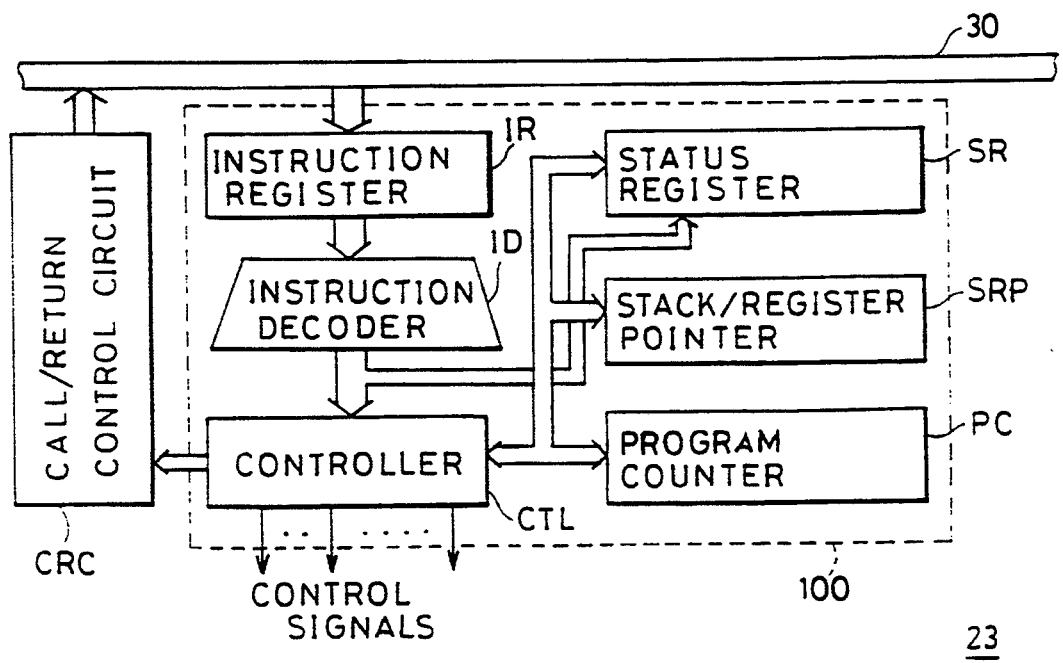
FIG. 7 is a diagram illustrating schematic constitution of an instruction decode stage in an arithmetic and logic processor according to the invention.

The invention provides structure to control overflow or underflow of the register file. That is, the invention provides improvement to the constitution relating to the instruction decode stage. FIG. 7 shows schematic constitution of only a part relating to the instruction decode stage in the control unit 23 shown in FIG. 6.

Referring to FIG. 7, the control unit 23 comprises an instruction register IR which latches instruction supplied through the internal bus 30, an instruction decoder ID which decodes instruction from the instruction register IR, and a controller CTL which generates various control signals in accordance with the decoded instruction from the instruction decoder ID.

The control unit 23 further comprises a status register SR which stores information indicating the state of the processor and condition code or the like in response to control signals from the instruction decoder ID and the controller CTL, a stack/register pointer SRP which generates information of address for the stack memory and address for the register file 20, each to be accessed next, in response to control signals from the controller CTL, and a program counter PC which stores address of program to be executed next. The program counter PC is incremented usually one by one, and when instruction such as jump JMP or the like is generated, the count value is incremented or decremented under control of the controller CTL.

The control unit 23 further comprises a call/return control circuit CRC which controls data transfer between the register file 20 and the stack memory 21. The call/return control circuit CRC executes the data transfer between the register file 20 and the stack memory 21 in response to control signals from the controller CTL.

Figure 8:
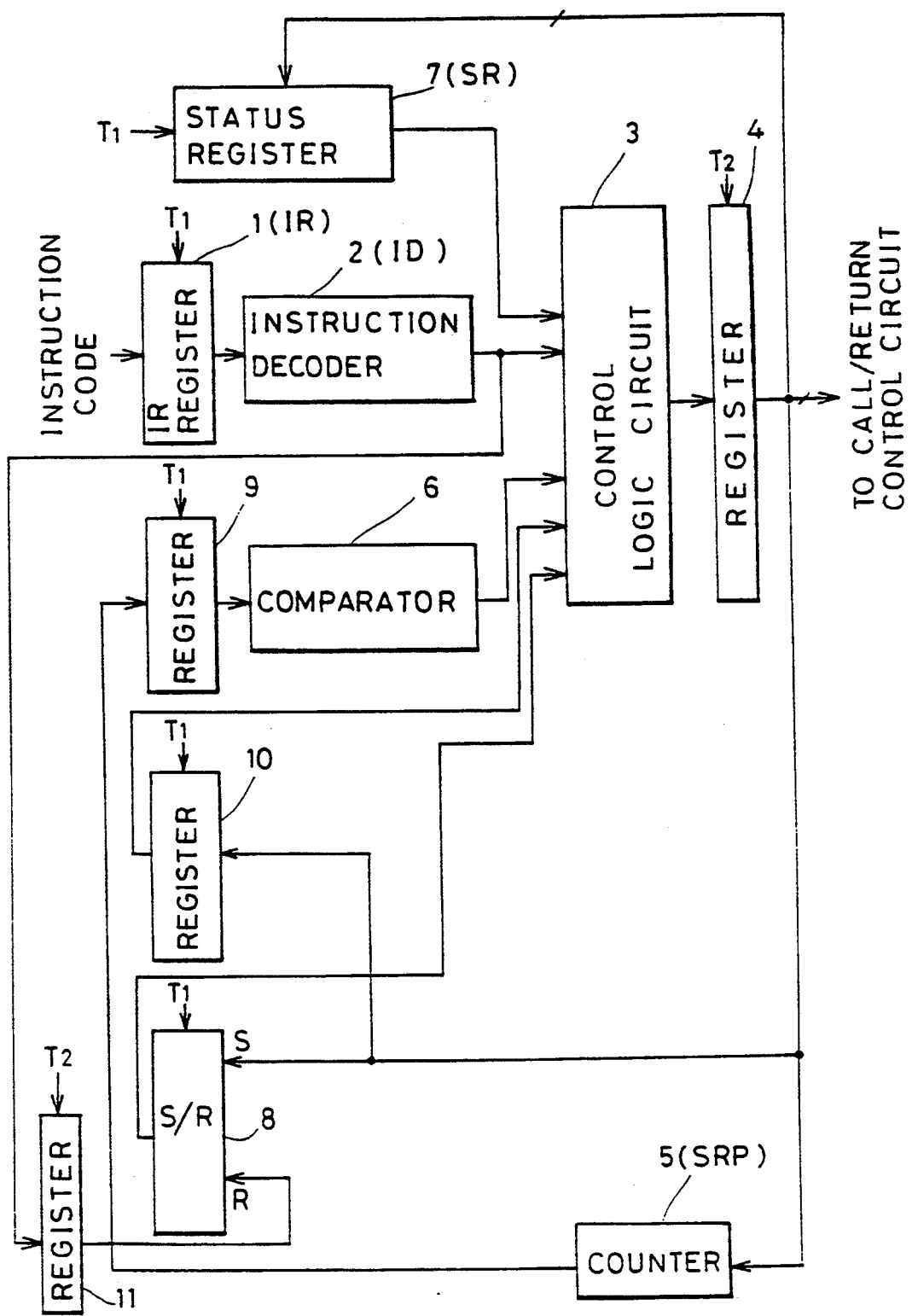
FIG. 8 is a diagram illustrating constitution of main part of an arithmetic and logic processor according to an embodiment of the invention.

FIG. 8 shows more specific constitution of part shown by a broken line block 100 in FIG. 7. Referring to FIG. 8, the control block 100 comprises an instruction register 1, an instruction decoder 2, a control logic circuit 3, a comparator 6, a status register 7 and an SR flipflop 8.

The instruction register 1 latches a supplied instruction code in response to clock signal T1 and supplies it to the instruction decoder 2. The instruction decoder 2 decodes the supplied instruction code, and supplies the decoded data to the control logic circuit 3 and also to the SR flipflop 8 through a register 11. The control logic circuit 3 generates various control signals in response to supplied instruction and a status supervisory information of the status register 7, and supplies the control signals to the register 4. The control signals generated from the control logic circuit 3 are transmitted through the register 4 to the status register 7, the counter 5 and the SR flipflop 8 and also to the call/return control circuit CRC in FIG. 7.

The counter 5 holds various pointers to store/restore register windows in/from the stack in response to the control signals from the control logic circuit 3. The pointer values held by the counter 5 are supplied through the register 9 to the comparator 6. The comparator 6 compares each pointer value from the counter 5, and generates signal indicating whether overflow or underflow may possibly occur. Signal indicating the comparison result of the comparator 6 is supplied to the control logic circuit 3. The status register 7 holds signal indicating what state is the state under execution, that is, store state, load state or other operation stale. The status information held by the status register 7 is supplied to the control logic circuit 3.

The flipflop 8 holds information indicating the trap state of call or return operation.

The control block 100 acts in response to non-overlapping two-phase clock signals T1, T2. Specifically, the instruction register 1, the SR flipflop 8, and the registers 9 and 10 act, in response to the clock T1, to latch and output supplied signals. On the other hand, the registers 4 and 11 latch and output supplied signals in response to the clock signal T2. Then, specific constitution of each circuit will be described referring to the accompanying drawings.

Figure 9:
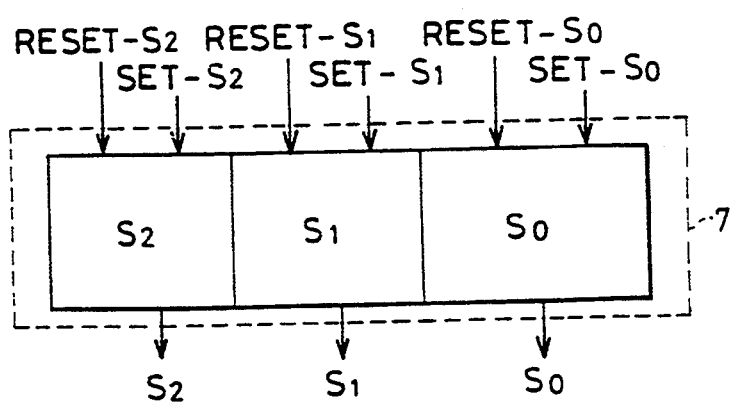
FIG. 9 is a diagram illustrating constitution of the state register shown in FIG. 8.

FIG. 9 shows an example of specific constitution of the status register 7. Referring to FIG. 9, the status register 7 is a register to hold the control state of the store of the register window, where five states are stored by three bits S0, S1 and S2. Set/reset of the register 7 is performed by outputs, set_si, and, reset_si, (i=0, 1, 2) from the control logic circuit 3. The five states which can be held by the status register 7 are called as follows, and the control operation performed in each state will now be described schematically.

Initial State (status bits (S2, S1 and S0)=(0, 0, 0).

If a supplied instruction is procedure call or procedure return, the state transition is preformed in accordance with the instruction. If a supplied instruction is neither call nor return, decision is performed regarding whether the register window should be saved in the stack 21 or should be restored from the stack 21 in the register file, and the state transition is performed in accordance with the result.

Call Trap Decision (status bits=001)

When procedure call is generated, decision is performed regarding whether the trap should be generated or not.

Return Trap Decision (status bits=010)

when procedure return is generated, decision is performed whether the trap should be generated or not.

Call Trap. (status bits=001)

It indicates that the call trap is under processing.

Return Trap (status bits=100)

It indicates that the return trap is under processing.

Store (status bits=101)

Decision is performed regarding whether a register window can be saved in the stack 21 or not. If it can be done, a control signal to save the register window in the stack 21 is outputted.

Load (status bits=110)

Decision is performed regarding whether a register window stored in the stack 21 can be restored to the register file 20, and if it can be done, a control signal to execute the restore is outputted.

Each control operation in accordance with the status bits S0, S1 and S2 of the status register 7 is performed in the control logic circuit 3.

It should be noted that the above-mentioned store/load state indicates the data transfer between the register file 20 and the stack 21 and not the data transfer between the memory 31 and the register 20.

Figure 10:
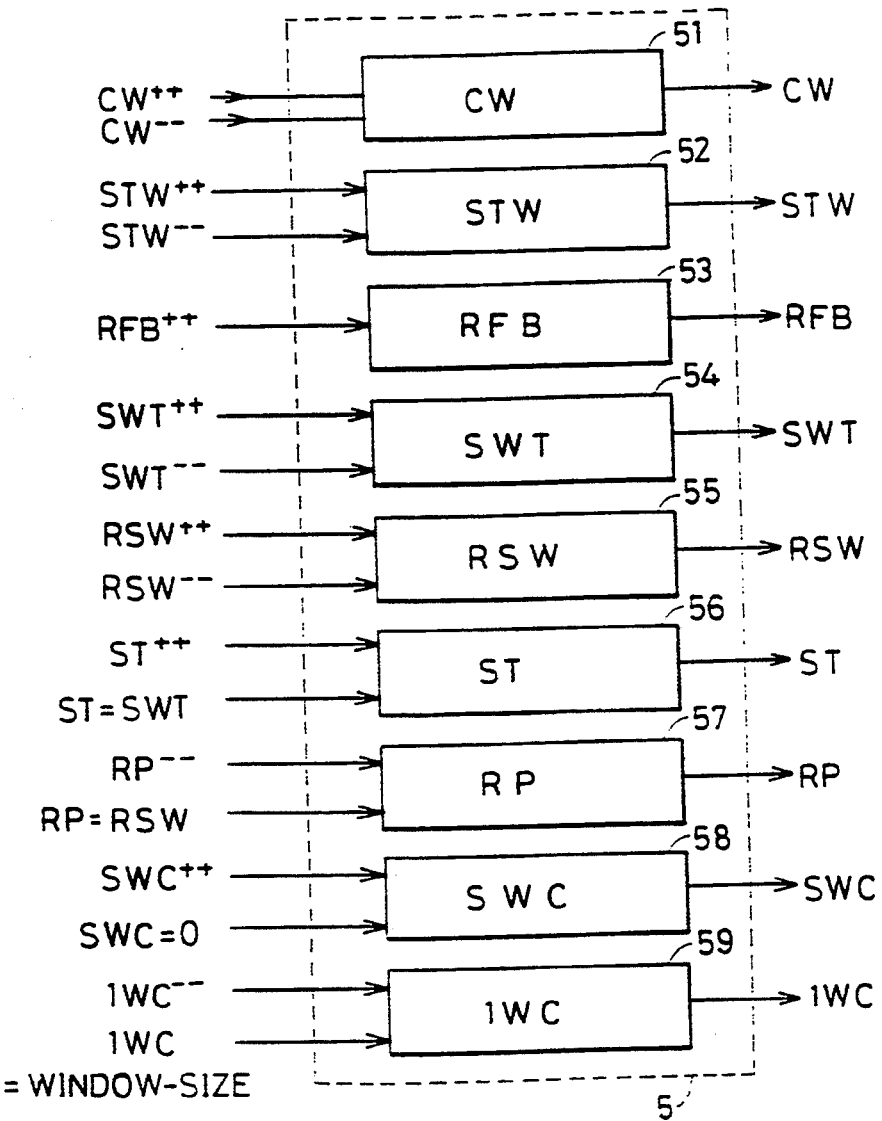
FIG. 10 is a diagram illustrating specifically an example of constitution of the counter 5 shown in FIG. 8.

FIG. 10 shows a specific constitution of the counter 5. Referring to FIG. 10, the counter 5 comprises nine counters 51, 52, 53, 54, 55, 56, 57, 58 and 59.

The cw (Current Window) counter 51 performs increment or decrement of the count value in response to control signals cw++ and cw− −. The cw counter 51 holds the base address (start address) of the register window used by the procedure under execution. Increment and decrement of the count value by the control signals cw++ and cw− − are performed so as to indicate the base addresses of next register window and preceding register window, respectively.

The stw (Stored Window) counter 52 performs increment or decrement of the count value in response to control signals stw++ and stw− −. The stw counter 52 holds the base address of the register window placed following the register window which has been saved in the stack (21 in FIG. 6). Increment and decrement of the count value of the stw counter 52 are performed so as to indicate the base addresses of next register window and preceding window, respectively.

The rfb (Register File Bottom) counter 53 performs increment of the count value in response to control signal rfb++. The rfb counter 53 holds address of the logical base of the register file 20 (the starting address of the register file 20). Since the register file 20 is used cyclically, the word pointed by the rfb counter 53 becomes the starting address of the register file. The count up or down of the rfb counter 53 is performed so as to indicate the base address of next register window or preceding register window. In the constitution shown in FIG. 10, however, only the control signal rfb++ to increment the count value of the rfb counter 53 is shown.

The swt (Stacked Window Top) counter 54 performs increment and decrement of the count value in response to control signals swt++ and swt− −. The register windows are saved in the stack memory 21, and among the register windows stored in the stack memory 21, the address next to the top register window (the most recently stored register window) is held in the counter. That is, storage of next register window is performed from the address indicated by the count value held by the swt counter 54. The up/down of the swt counter 54 is performed in window size unit. The window size is specified by the control signal WINDOW_SIZE (hereinafter described).

The rsw (Restore Window Top) counter 55 performs increment/decrement of the count value in response to control signals rsw++ and rsw− −. When underflow of the register file is generated, the register window must be restored from the stack 21 to the register file. In this case, the rsw counter 55 holds the address next to the window to be restored on the stack 21.

Increment/decrement of the count value of the rsw counter 55 is performed in window size unit.

The st (Stack Top) counter 56 sets the count value in response to control signals st++ and st=swt. If the control signal st++ is given, the count value thereof is incremented, and if the signal st=swt is given, the count value is set to value designated by the signal swt. The st counter 56 holds the top address of the stack memory 21. Generally, the stack memory 21 is not separately installed for exclusive use to the stack, but the stack region is frequently constituted within the general-purpose memory, for example, and therefore the top address of the secured stack region in the memory region is held in the counter 56.

The rp (Restore Pointer) counter 57 sets the count value in response to control signals rp− − and rp=rsw. When the control signal rp− − is supplied, decrement of the count value thereof is performed. When the control signal rp=rsw is supplied, the count value thereof is set to the value designated by the signal rsw. The rp counter 57 holds the address of the most recently restored word in the stack memory 21.

The swc (Store Word Counter) counter 58 sets the count value in response to control signals swc++ and swc=0. When the signal swc++ is supplied, increment of the count value thereof is performed. When the control signal swc=0 is supplied, the count value thereof is set to "0". The swc counter 58 counts the word number saved during the save of a register window. The lwc (Load Word Counter) counter 59 sets the count value in response to control signals lwc− − and lwc=WINDOW_SIZE. When the control signal lwc− − is supplied, decrement of the count value thereof is performed. When the control signal lwc=WINDOW_SIZE is supplied, the count value thereof is set to value specified by the signal WINDOW_SIZE. The lwc counter 59 counts the word number restored during the restore of a register window.

Any of the control signals supplied to the counter 5 is generated from the control logic circuit 3. In the control signals shown in FIG. 10, however, only the control signals relating to the operation of the invention are shown. Also in FIG. 10, signal outputted by each of the counters 51–59, i.e., the count value held by each counter is designated by the same symbol as the name of the counter.

Figure 11A:
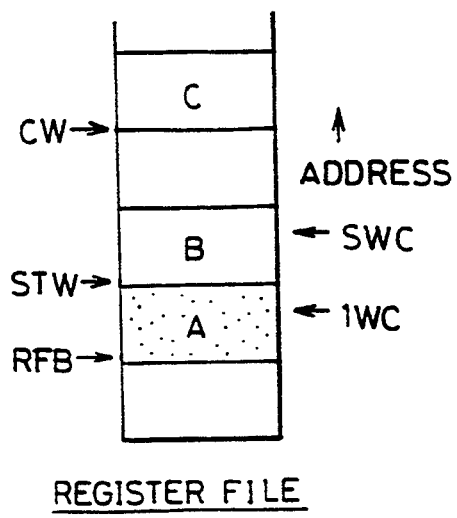
FIGS. 11A and 11B are diagrams illustrating relation between each output of the counter 5 and addresses in a register file and a stack.
Figure 11B:
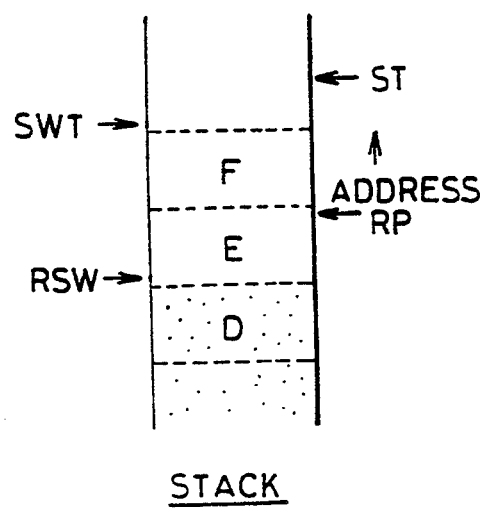

FIGS. 11A and 11B show rough image of the relation between the output signals of the counters 51–59, i.e., pointers and the register file and the stack. FIG. 11A shows the relation between the register file and the control signals cw, stw, rfb, sw and lwc from each counter, and FIG. 11B shows the relation between addresses in the stack and the output signals swt, rsw, rp and st of each counter.

In FIGS. 11A and 11B, the address increases in the upward direction of the figure, and the case is exemplified that as the call of the procedure becomes deep in the register file, the register window is moved in the upward direction of the figure.

In FIG. 11A, the window A is a window placed at the lowest position in the register file. The window B is a window saved in the stack. The window C is a register window currently used by the procedure under execution.

In FIG. 11B, the window D indicates a restored window region, the window E indicates a window region to be restored next, and the window F indicates a window region stored most recently.

Figure 12:
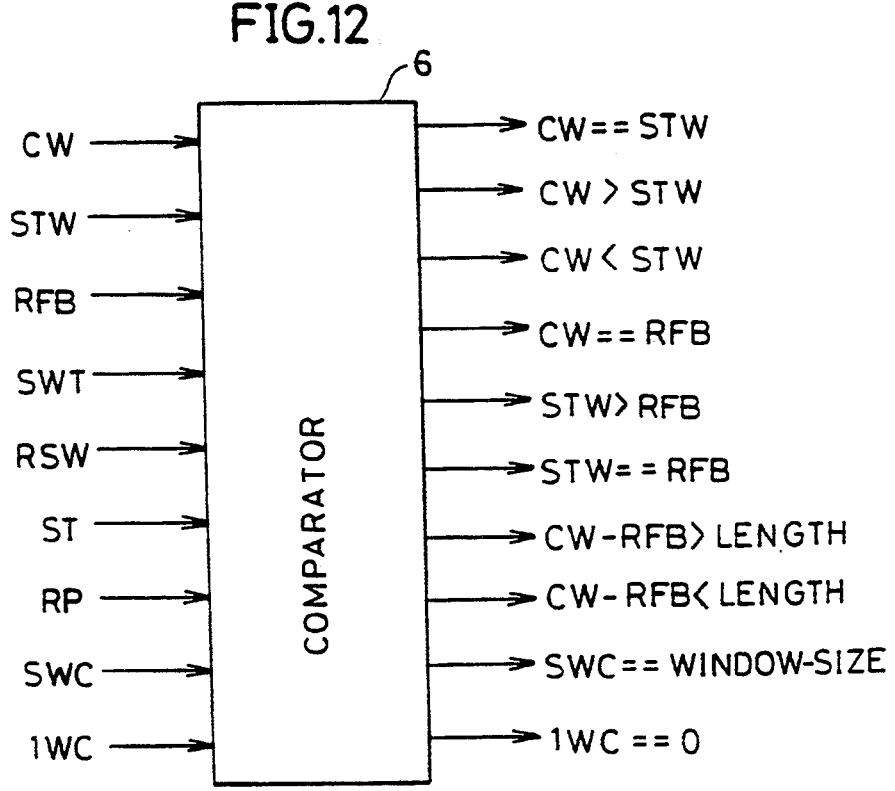
FIG. 12 is a diagram illustrating input/output signals of the comparator in FIG. 8.

An output of the counter 5 is transmitted through the register 9 to the comparator 6. The comparator 6 compares each output signal from the counter 5, i.e., pointer of each counter, and outputs a signal corresponding to the comparison result. FIG. 12 shows signals outputted by the comparator 6. Next, the meaning of each output signal of the comparator 6 shown in FIG. 12 will be described.

The signal cw==stw indicates that the count value cw held by the cw counter 51 is equal to the count value stw held by the stw counter 52. That is, the signal cw==stw indicates that the base address of currently used window (current window) is equal to the base address of the register window placed next to the stored register window. Consequently, when the signal cw==stw is generated, the currently used register window is the register window to be saved next.

The signal cw>stw indicates that the output cw of the cw counter 51 is greater than the value stw of the stw counter 52. The signal cw>stw indicates that a register window to be saved exists before the register window used by the current procedure.

The signal cw<stw indicates that the output cw of the cw counter 51 is less than the output stw of the stw counter 52. Consequently, the signal cw<stw indicates that the register window currently used by the procedure is the register window whose saving is completed.

The signal cw==rfb indicates that the output cw of the cw counter 51 is equal in value to the output rfb of the rfb counter 53. That is, it indicates that the currently used register window is the bottom register window of the register file.

The signal stw>rfb indicates that the Output stw of the stw counter 52 is greater than the output rfb of the rfb counter 53. That is, it indicates that at least one register window exists between the register window to be saved next and the bottom register window of the register file.

The signal stw==rfb indicates that the output stw of the stw counter 52 is equal in value to the output rfb of the rfb counter 53. That is, the signal stw==rfb indicates that the register window to be saved next is the bottom register window of the register file.

The signal cw-rfb>LENGTH indicates that difference between the output cw of the counter 51 and the output rfb of the counter 53 is greater than the predetermined constant LENGTH. This signal indicates that there is no possibility of occurrence of the underflow.

The signal cw-rfb<LENGTH indicates that difference between the output cw of the counter 51 and the output rfb of the counter 53 is less than the predetermined constant LENGTH. That is, this signal indicates that there is any possibility of occurrence of the underflow.

The signal swc==WINDOW_SIZE indicates that the output swc of the swc counter 58 is equal in value to the window size WINDOW_SIZE. That is, this signal indicates that transfer of the register window from the register file to the stack memory is completed. In this case, the window size WINDOW_SIZE may be a constant value for each procedure, or may be variable corresponding to respective processings, i.e., contents of respective procedures.

The signal lwc==0 indicates that the output lwc of the lwc counter 59 is equal to 0. This signal indicates that transfer of the register window from the stack memory to the register file is completed by the restore.

The instruction decoder 2 receives an instruction code from the instruction register 1 and generates corresponding control signals. Now, only control signals relating to the invention will be described.

call

It indicates that supplied instruction is procedure call.

return

It indicates that an instruction is return from the procedure.

use_mem

It indicates that supplied instruction is an access to a memory other than the stack 21. In the RISC, it basically indicates that the supplied instruction is "load" or "store".

call_trap_end

It indicates that trap processing of the call is finished.

return_trap_end

It indicates that trap processing of the return is finished.

Figure 13:
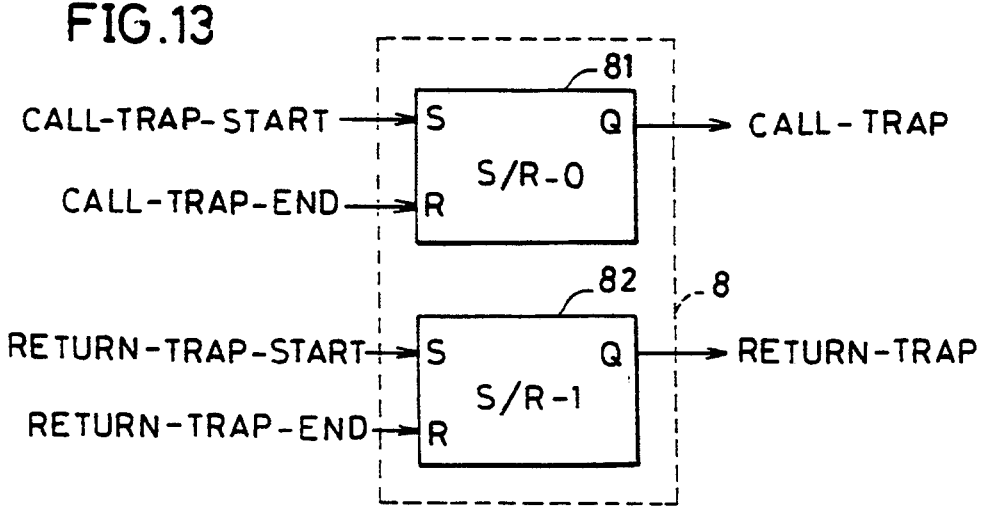
FIG. 13 is a diagram illustrating constitution of the flipflop 8 in FIG. 8.

Referring to FIG. 13, the flipflop 8 for indicating whether or not the state is the trap state comprises two set/reset flipflops 81, 82. The first S/R flipflop 81 receives signal call_trap_start indicating the trap start at its set input S and also receives signal call_trap_end indicating the trap end at its reset input R. Its Q output generates a signal call_trap indicating that the trap is under processing, and supplies the generated signal to the control logic circuit 3.

The second S/R flipflop 82 receives signal return_trap_start indicating the start of the return trap at its set input S and also receives signal return_trap_end indicating the end of the return trap at its reset input R, and its Q output supplies signal return_trap indicating that the return trap is under processing.

Figure 14:
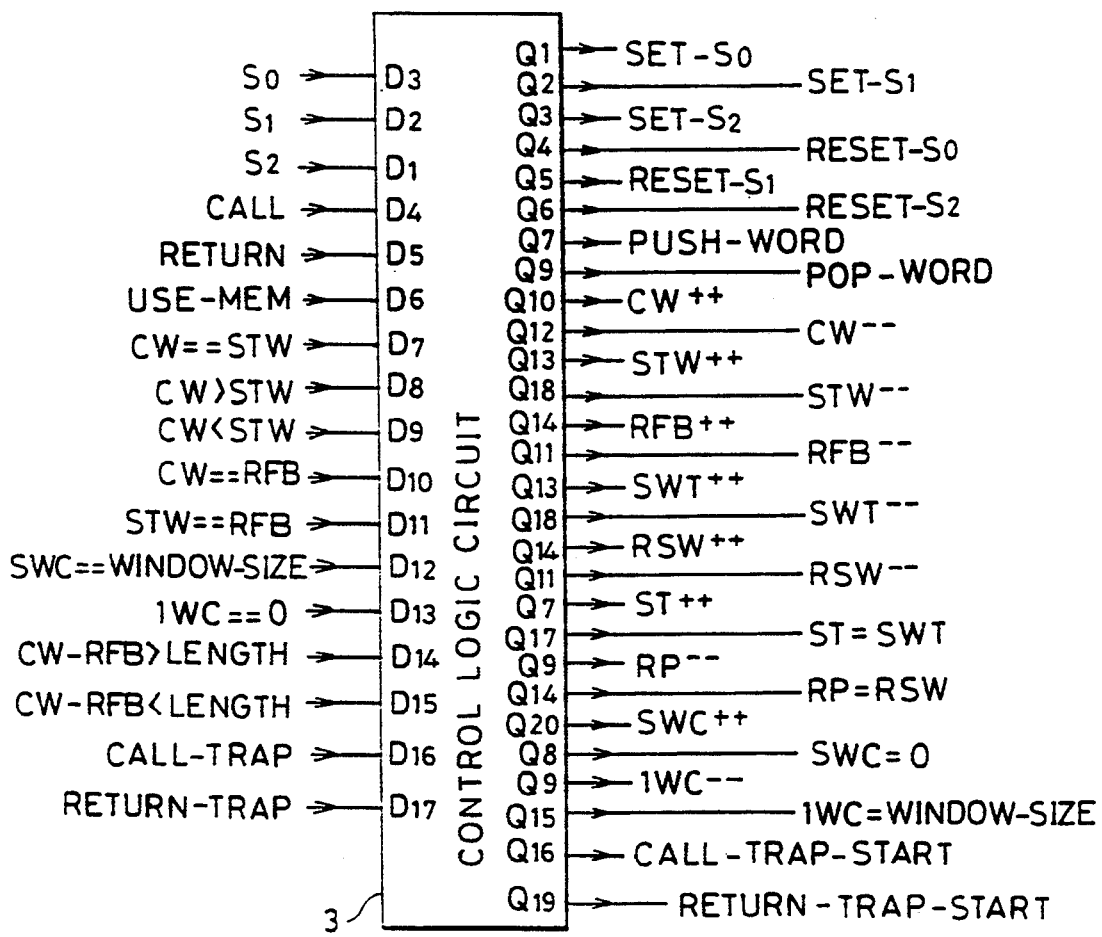
FIG. 14 is a diagram illustrating input/output signals of the control logic circuit in FIG. 8.

FIG. 14 shows input/output signals of the control logic circuit 3. Referring to FIG. 14, the control logic circuit 3 receives signals from the instruction decoder 2, the status register 7 and the flipflop 8 at its input terminals D1–D17, and supplies control signals to the status register 7, the counter 5 and the flipflop 8, and also outputs a signal to the transfer control circuit (CRC in FIG. 7). The signals as shown in FIG. 14 also include push instruction and pop instruction as control signals for call/return control as hereinafter described.

The control signal push_word provides operation of pushing the word at the address (stw+swc) of the register file to the stack.

The control signal pop_word provides instruction of loading the word within the stack indicated by the pointer rp of the rp counter 57 to the address (rfb+rwc) of the register file. Next, operation of the arithmetic and logic processor of the invention will be schematically described.

The status register 7 holds information indicating what state is done. The stack/register pointer srp (counter 5) stores address information of the register window being currently accessed and the register window to be accessed next in the register file and the stack.

The instruction decoder 2 decodes an instruction supplied from the instruction register 1 and supplies the decoded instruction to the control logic circuit 3. The control logic circuit 3 interprets a control signal supplied from the instruction decoder 2, in accordance with the status information held by the status register 7.

If a supplied instruction is neither "call" instruction nor "return" instruction, the control logic circuit 3 decides possibility that overflow can occur in the register file and that underflow can occur therein, in accordance with the information from the comparator 6. If there is great possibility of the occurrence of overflow/underflow, a control signal is supplied to the call-/return control circuit CRC (refer to FIG. 7), and the data transfer is performed between the register file and the stack in accordance with the point held by the stack-/register pointer (counter 5).

On the other hand, if the instruction supplied from the instruction decoder is "call" instruction or "return" instruction, the control logic circuit 3 decides whether the trap must be generated in response to signal from the comparator 6, and traps the call/return in accordance with the decision result and starts a trap routine in OS or the like. Next, specific operation of the control logic circuit 3 will be described.

(1) Initial State: (s2, s1, s0)=(000)

If the hardware is reset, this state appears first.

(i) If an instruction supplied from the instruction decoder 2 is neither call nor return (!call·!return), difference between the output cw of the cw counter 51 and the output rfb of the rfb counter 53 is compared with the predetermined appropriate constant LENGTH. The comparison is performed by supervising the output signals from the counter 5 and the comparator 6.

(a) cw-rfb>LENGTH

In this case, it indicates that the number of words from the base address of the register window currently used by the procedure under execution to the address of the logic base of the register file is larger than the constant LENGTH. In other words, it indicates that the register file has little margin. Consequently, the register window must be saved to the stack 21. Therefore the control logic circuit 3 generates control signals set_s0 and set_s2, and bits s0 and s2 of the status register 7 are set so that the transition of next status to the store state is performed.

(b) cw-rfb<LENGTH

In this case, the number of words between the base address of the register window currently used by the procedure under execution and the address of the base of the register file becomes less than the constant LENGTH, and it indicates that possibility of the occurrence of underflow is high. Consequently, the register window already saved must be restored from the stack 21 to the register file. Therefore the control logic circuit 3 in this case generates control signals set_s1 and set_s2 to set bits s1, s2 of the status register 7 so that the transition of next status to the load state is performed.

(c) cw-rfb==LENGTH

Any of steps (a), (b) will do. Also the comparison reference value LENGTH in the steps (a), (b) may be the same or different.

(ii) Where a supplied instruction is call

In this case, since the current procedure under execution calls other procedure, the register window must be moved. Consequently the control logic circuit 3 performs increment of the count value of the cw counter 51 by the signal WINDOW_SIZE specifying the window size and moves the register window. In this case, if overflow is produced, the overflow portion must be transferred to the stack 21. Consequently, in order to decide whether the trap must be generated, the control logic circuit 3 generates the signal set_s0 and sets the bit s0 of the status register 7 to perform transition of next status to the call trap decision state.

(iii) Where a supplied instruction is return

Since this case means the return from the current procedure to the original procedure, decrement of the count value of the cw counter 51 is performed to move the register window. In order to decide whether the return trap must be generated, the control signal set_s1 is generated and the bit s1 of the status register 7 is set so that transition of next status to the return trap decision state is performed.

(2) Call Trap Decision: (s2, s1, s0)=(001)

(i) cw is not equal to rfb (cw!=rfb)

In this case, since it is clear that overflow of the register file is not produced, the status is merely moved to the initial state.

That is, reset of each bit of the status register 7 is performed by reset signal from the control logic circuit 3.

(ii) cw is equal to rfb (cw=rfb)

(a) Where the output stw of the stw counter 52 is not equal to the output rfb of the rfb counter 53 (stw!=rfb)

In this case, since the register file indicated by the output cw of the cw counter 51 has already been saved to the stack 21, overwrite to this region may be done. Consequently in this case, the control signal rfb++ is generated and increment of the count value of the rfb counter 53 is performed so that the base of the register file is raised to designate the bottom address of next register window. At the same time, the control signal rsw++ is generated to increment the count value of the rsw counter 55, thereby the register window which is stored in the stack 21 and to be restored next is raised by one in the stack 21.

Then since a register window to be restored (to become an overwritten register window) exists, the restore must be stopped. Consequently, the lwc counter 59 is reset to value designated by the WINDOW_SIZE, and the count value rp of the rp counter 58 is set to the value of the pointer rsw of the rsw counter 55. Thereby the address of the last word restored from the stack is set to the address next to the window to be restored. In order to set the next status to the initial state, each of the bits s0, s1 and s2 of the status register is reset.

(b) Where stw is equal to rfb (stw=rfb)

In this case, since the register file designated by the pointer cw of the cw counter 51 is not yet saved to the stack 21, the overwrite to this region cannot be performed. Consequently, the trap is generated and the register window save routine must be started. Consequently, the control logic circuit 3 generates the signal call_trap_start and sets the flipflop 81 to move the status to the call trap state. That is, the signal call_trap is generated, and each bit (s2, s1, s0) of the status register 7 is set to (011).

(3) Return Trap Decision: (s2, s1, s0)=(010)

(i) Where the base address of the register window used by the procedure under execution is not equal to the address of the logic base of the register file (cw!=rfb)

(a) If the pointer cw is greater than the pointer stw, since the register window designated by the pointer cw is not yet stored to the stack 21, the overwrite may be done to this region. Consequently in this case, the status is merely moved to the initial state. That is, the reset signal reset_s1 is generated from the control logic circuit, and the status register 7 is reset.

(b) Where the pointer cw is equal to the pointer stw (cw==stw)

The register window indicated by the pointer cw is not yet stored in the stack 21 or is on the way of the store thereof. When the register file (window) is on the way of the store to the stack memory 21, the store must be stopped (for the return). Consequently, the count value of the swc counter 58 is reset to "0" and the count value of the number of the words of the stored register file (register window) is reset to "0", and the top address st of the stack 21 is set to the pointer swt indicating the top address of the stacked windows. In order to put next status to the initial state, the status register 7 is reset.

(c) Where value of the pointer cw is less than that of the pointer stw (cw<stw)

In this case, since the register window indicated by the pointer cw is already stored in the stack 21, the register window stored within the stack must be cancelled. Consequently the control signal swt−− is generated and decrement of the pointer swt of the swt counter 54 is performed so as to indicate the top address of the previously stacked register windows. The pointer st is set to the value of the pointer swt and the top address of the stack is set to the value of the top address of the stored windows. Subsequently each bit of the status register 7 is reset and the status is moved to the initial state.

(ii) Where the pointer cw is equal to the pointer rfb (cw==rfb)

In this case, since underflow of the register file is generated, the trap must be generated for the return and the routine for the restore of the register window on the stack memory 21 must be started. Consequently, the control logic circuit 3 in this case generates the signal return_trap_start and sets the flipflop 82 of the flipflop 8 to generate the signal return_trap for starting the return trap routine, The status register 7 is set to (100) and the status is moved to the return trap state.

(4) Call Trap: (s2, s1, s0)=(011)

In this state, the save of the register window under control by the control logic circuit 3 is inhibited, and the processing is entrusted to the trap routine (included in OS for example) to eliminate the overflow state. When the trap routine is finished, the control logic circuit 3 generates signal call_trap_end and resets the flipflop 81, and also resets the status register 7 to the initial state.

(5) Return Trap: (s2, s1, s0)=(100)

In this state, the transfer of the register window under control of the control logic circuit 3 is inhibited, and the processing operation is entrusted to the trap routine (included in OS for example). The restore of the register window on the stack 21 is completed under control of the trap routine. When the trap routine is finished, the control logic circuit 3 generates signal return_trap_end indicating the end of the return trap routine and resets the flipflop82, and also resets the status register 7 to the initial state.

(6) Store: (s2, s1, s0)=(101)

(i) Where a supplied instruction is not an instruction to access the memory and the pointer cw is not equal to the pointer stw and the pointer swc is not equal to the WINDOW_SIZE (!use_mem·cw!=stw·swc!=WINDOW_SIZE).

This case indicates that a register window exists whose saving to the stack 21 is not completed. Consequently, the control logic circuit 3 in this case generates the control signal push_word and supplies the signal to the call/return control circuit CRC in response to the push_word, the call/return control circuit CRC uses the pointer stw held by the counter 52 as a base address and uses the pointer swc held by the counter 58 as an offset address to push to the stack 21 the word of the register file at the calculated position. The swc counter 58 and the sw counter 56 are incremented respectively in response to the control signals swc++, st++ in preparation for next push. Next status is the initial state.

(ii) Where the pointer swc indicated by the swc counter is equal to the signal WINDOW_SIZE representing the window size (swc=WINDOW_SIZE)

In this case, the register window indicated by the pointer stw of the stw counter 52 is stored at all in the stack 21, and the store operation for that register window is completed. Consequently, the pointers stw of the stw counter 52 and the swt counter 54 are incremented respectively by the control signals stw++, swt++, to point respective next addresses of the base addresses of the next register window in the register files and of the top register window among the windows stored in the stack. Also the swc counter 58 is reset by the control signal swc=0, and the number of the transferred words is set to "0". Next status is the initial state, and the status register is reset to the initial state.

(7) Load: (s2, s1, s0)=(110)

(i) Where the pointer lwc of the lwc counter 59 is not 0 and a supplied instruction is not an instruction to access the memory (lwc!=0·!use_mem)

In this case, since there is a register window whose restoring from the stack 21 is not completed, word or words must be popped from the stack to the register file. Consequently, the pointer lwc of the lwc counter 59 and the pointer rp of the rp counter 57 are decremented respectively by the control signals lwc— —, rp— — in preparation for the pop. Also the control signal pop_word is generated. In response to the control signal pop_word, the call/return control circuit CRC uses the pointer rsw as a base address and uses the pointer lwc as an offset address to store the word on the calculated stack 21 to the register file. Since next status is the initial state, the status register 7 is reset to the initial state.

(ii) Where the pointer lwc is equal to 0 (lwc==0)

In this case, the register window indicated by the pointer rsw has been restored at all. Consequently in this case, the control signals rfb— —, rsw— — are generated and the pointers rsw and rfb are decremented. The control signal lwx=WINDOW_SIZE is also generated and the pointer lwc is reset by the window size (the number of words). Since next status is the initial state, the status register 7 is reset.

FIG. 15 shows the above-mentioned state transition in a table. From the table of the state transition shown in FIG. 15, output signals generated by the control logic circuit 3 can be expressed using input signals thereof.

FIG. 16 shows a table in which the output signals of the control logic circuit 3 are expressed using the input signals thereof. Relation of input and output signals shown in FIG. 16 can be obtained from the expedient that each status bit of the status register 7, a signal indicating the condition and the resultant output signal in the state transition shown in FIG. 15, are expressed simply using logical sum and logical product. For example, the bit s0 of the status register 7 is set in the case that the call instruction is supplied at the initial state or in the case that the supplied instruction is neither call instruction nor return instruction and the count cw-rfb is greater than the constant LENGTH. From these relations, the relation of set_s0=!s0·!s1·!s2·(!call·!return·cw-rfb>LENGTH+call) can be obtained. Relation for other output signal can be obtained similarly.

There are two methods to realize the circuit constitution satisfying the input/output relation of the control logic circuit 3 shown in FIG. 16. One is a method using the programmable logic array PLA, and the other is a method using wired logics. The control logic circuit may be designed using any of the methods. At any rate, after the input/output relation shown in FIG. 16 is obtained, the control logic circuit can be designed routinely, and moreover, in the process of simplifying the logic in the input/output relation, different circuits having the same function can be also obtained.

Figure 17A:
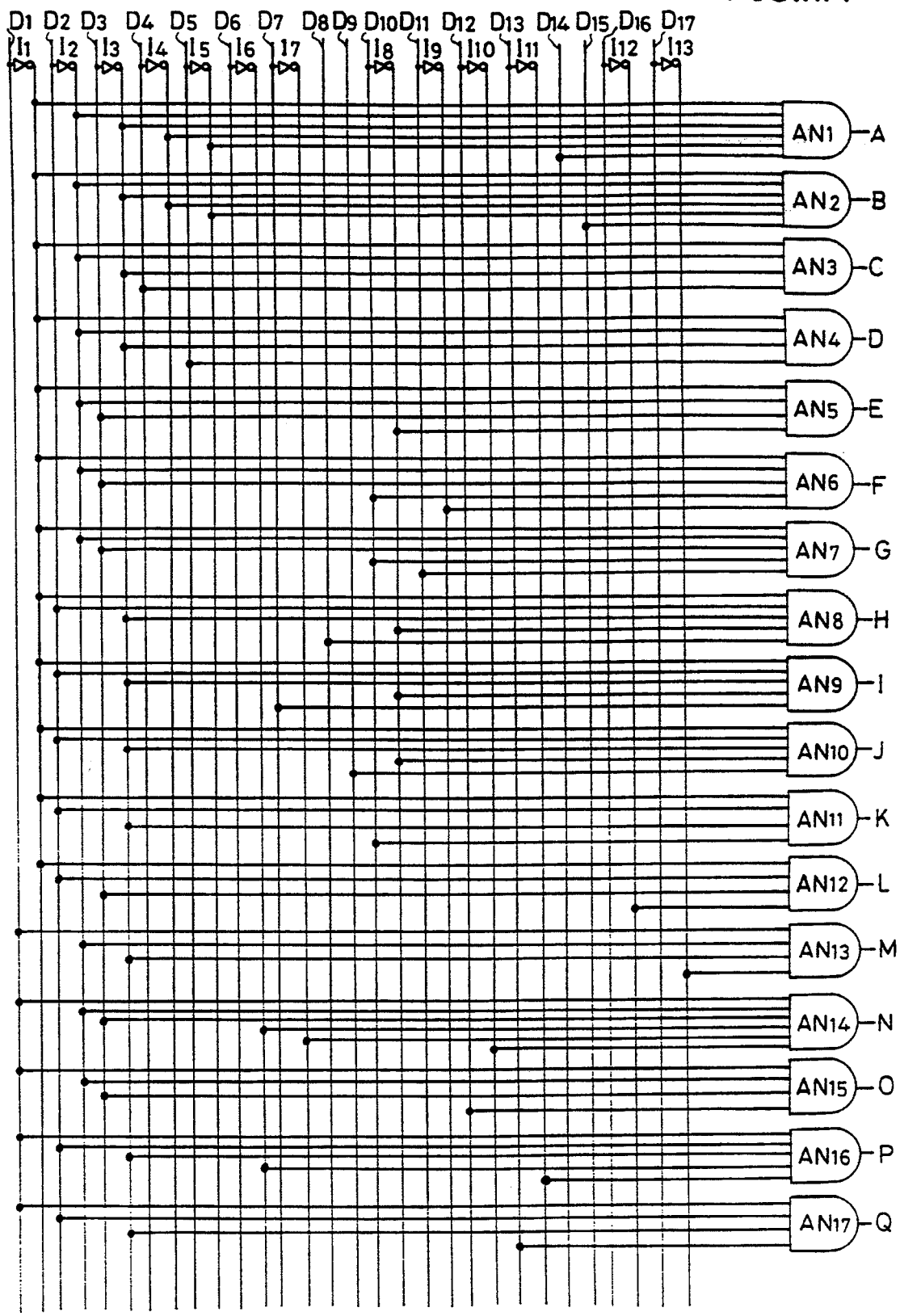
FIGS. 17A and 17B are diagrams illustrating an example of circuit constitution to realize the input/output relation shown in FIG. 16.
Figure 17B:
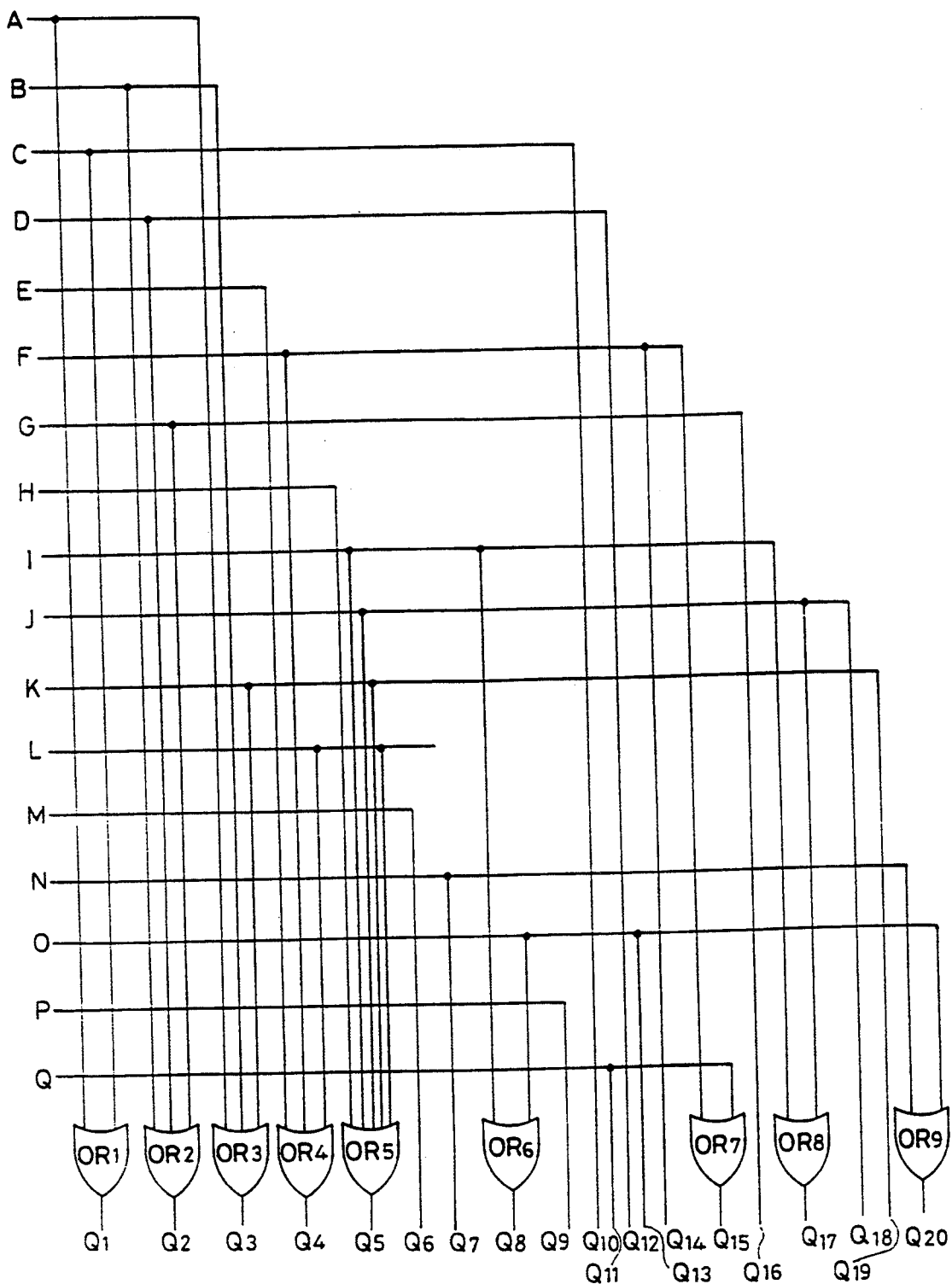

FIGS. 17A and 17B show an example of the construction where the input/output relation shown in FIG. 16 is realized using PLA. FIG. 17A shows construction of AND array part, and FIG. 17B shows construction of OR array part. Input signals D1–D17 correspond to the input terminals of the control logic circuits shown in FIG. 14, and also output signals Q1–Q20 shown in FIG. 17B correspond to the output terminals of the control logic circuit shown in FIG. 14.

In FIG. 17A, AND gate AN1 receives inverted signal of the status bit s2 through the inverter I1, the inverted signal of the status bit s1 through the inverter I2, inverted signal of the status bit s0 through the inverter I3, the inverted signal of the signal, call, through the inverter I4, inverted signal of the signal, return, through the inverter I5, and the signal indicating cw-rfb>LENGTH.

AND gate AN2 receives inverted signal of the bit s2, inverted signal of the bit s1, inverted signal of the bit s0, inverted signal of the signal "call", inverted signal of the signal return, and signal cw-rfb<LENGTH.

AND gate AN3 receives inverted signal of the bit s2, inverted signal of the bit s1, inverted signal of the bit s0, and the signal "call".

AND gate AN4 receives inverted signal of the bit s2, inverted signal of the bit s1, inverted signal of the bit s0, and the signal "return".

AND gate AN5 receives inverted signal of the bit s2, inverted signal of the bit s1, the bit s0, and inverted signal of the signal, cw==rfb, through the inverter I8.

AND gate AN6 receives inverted signal of the bit s2, inverted signal of the bit s1, the bit s0, the signal cw==rfb, and inverted signal of the signal stw==rfb through the inverter I9.

AND gate AN7 receives inverted signal of the bit s2, inverted signal of the bit s1, the bit s0, the signal cw==rfb, and the signal stw==rfb.

AND gate AN8 receives inverted signal of the bit s2, the bit s1, inverted signal of he bit 0, the signal cw>stw, and inverted signal of the signal cw==rfb.

AND gate AN9 receives inverted signal of the bit s2, the bit s1, inverted signal of the bit s0, the signal cw==rfb, and the signal cw==rfb.

AND gate AN10 receives inverted signal of the bit s2, the bit s1, inverted signal of he bit s0, the signal cw<stw, and inverted signal of the signal cw==rfb.

AND gate AN11 receives inverted signal of the bit s2, the bit s1, inverted signal of the bit s0, and the signal cw==rfb.

AND gate AN12 receives inverted signal of the bit s2, the bit s1, the bit s0, and inverted signal of the signal call_trap through the inverter I12.

AND gate AN13 receives the bit s2, inverted signal of the bit s1, inverted signal of the bit s0, and inverted signal of the signal return_trap through the inverter I13.

AND gate AN14 receives the bit s2, inverted signal of the bit s1, the bit s0, inverted signal of the signal use_mem through the inverter I6, inverted signal of the signal cw==stw, and the signal swc==WINDOW_SIZE.

AND gate AN15 receives the bit s2, inverted signal of the bit s1, the bit s0, and the signal swc==WINDOW_SIZE.

AND gate AN16 receives the bit s2, inverted signal of the bit s0, inverted signal of the signal use_mem, and inverted signal of the signal lwc==0 through the inverter I11.

AND gate AN17 receives the bit s2, the bit s1, inverted signal of the bit s0, and the signal lwc==0.

OR gate OR1 receives outputs of the AND gates AN1 and AN3. The signal set_s0 is outputted from the OR gate OR1.

OR gate OR2 receives outputs of the AND gates AN2, AN4 and AN7. The signal set_s1 is outputted from the OR gate OR2.

OR gate OR3 receives outputs of the AND gates AN1, AN2 and AN11. The signal set_s2 is outputted from the OR gate OR3.

OR gate OR4 receives outputs of the AND gates AN5, AN6 and AN12. The signal reset_s0 is outputted from the OR gate OR4.

OR gate OR5 receives outputs of the AND gates AN8, AN9, AN10, AN11 and AN12. The signal reset_s1 is outputted from the OR gate OR5.

Output of the AND gate AN13 is outputted to the output terminal Q6. The signal reset_s2 is outputted from the output terminal Q6.

Output of the AND gate AN14 is connected to the output terminal Q7. The signals push_word, st++ are outputted from the terminal Q7.

OR gate OR6 receives outputs of the AND gates AN9 and AN15. The signal swc=0 is outputted from the OR gate OR6.

Output of the AND gate AN16 is connected to the output terminal Q9. The signals pop_word and rp-- and lwc-- are outputted from the terminal Q9.

Output of the AND gate AN3 is connected to the terminal Q10. The signal cw++ is outputted from the terminal Q10.

Output of the AND gate AN17 is connected to the terminal Q11. The signals rfb-- and rsw-- are outputted from the terminal Q11.

Output of the AND gate AN15 is connected to the terminal Q13. The signals stw++, swt++ are outputted from the terminal Q13.

Output of the AND gate AN6 is connected to the terminal A14. The signals rfb++, rsw++ and rp=rsw are outputted from the terminal Q14.

OR gate OR7 receives outputs of the AND gates AN6 and AN17. The signal lwc=WINDOW_SIZE is outputted from the OR gate OR7.

Output of the AND gate AN7 is connected to the terminal Q16. The signal call_trap_start is outputted from the terminal Q16.

The OR gate OR8 receives outputs of the AND gates AN9 and AN10. The signal st=swt is outputted from the OR gate OR8.

Output of the AND gate AN10 is connected to the terminal Q18. The signals stw--, swt-- are outputted from the terminal Q18.

Output of the AND gate AN11 is connected to the terminal Q19. The signal return_trap_start is outputted from the terminal Q19.

OR gate OR9 receives outputs of the AND gates AN14 and AN15. The signal swc++ is outputted from the OR gate OR9.

According to the above-mentioned construction, the circuitry to generate signals satisfying the logic relation as shown in FIG. 16 can be obtained. Of course, the circuit configuration shown in FIGS. 17A and 17B is merely an example, and other circuit configuration can also provide similar effects as far as it satisfies the logic relation shown in FIG. 16.

In the embodiment, the instruction decoder and the control logic circuit for performing transfer of data between the register 20 and the stack 21 only are shown, and parts relating to the other instructions are not described. However, these parts may be constructed using similar circuit construction to a prior art device. Consequently when the instruction decoder shown in FIG. 8 is supplied with an arithmetic instruction such as adding instruction, the control logic circuit 3 in FIG. 8 has no relation thereto, and the instruction is executed by other circuit part controlling that operation (included in the part of the controller CTL shown in FIG. 7) and the control signal for that arithmetic execution is supplied to the arithmetic unit 22.

In the embodiment, although the RISC computer is shown as an example of the arithmetic and logic processor, the invention can be applied to any arithmetic and logic processor having the register file structure.

Also in the embodiment, the moving direction of the register window is assumed to be the direction that as the procedure call becomes deep, the register window is moved in the upward direction of the figure, but even when the register window is moved in the downward direction of the figure, similar effects to the embodiment can be obtained.

According to the invention as above described, since difference between the base address of the register window currently used by the procedure during execution and the bottom address of the register file is compared with a predetermined constant and transfer of data between the register file and the stack is performed based on the comparison result, prior to generation of overflow of the register file, a register window used by a procedure called in the past can be saved to the memory, and the processing that the register window in the deep procedure call is already saved to the memory is most probably completed, thereby overflow in the register file can be prevented from being generated.

Also when there are some empty registers in the register file, since the register window saved to the memory is most probably restored to the register file, underflow in the register file can be prevented from being generated. Thereby generation of the overflow and the underflow can be suppressed without increasing the size of the register file, and deterioration of performance of the arithmetic and logic processor due to the overflow and the underflow can be prevented.

Although the present invention has been described and illustrated in detail, it is clearly understood that the same is by way of illustration and example only and is not to be taken by way of limitation, the spirit and scope of the present invention being limited only by-the terms of the appended claims.

What is claimed is:

1. An arithmetic and logic processor having a register file and a first memory, wherein said register file includes a plurality of register windows one assigned to each procedure, and each of the plurality of register windows includes a plurality of registers, said processor comprising:

decoding means for decoding a supplied instruction to determine whether the supplied instruction is an instruction requiring a procedure different from a current procedure under execution;

first comparing means for comparing difference between a start address of a register window used by a procedure under execution and a starting address of said register file with a predetermined constant, when said decoding means indicates that the supplied instruction is an instruction other than the instruction requiring a procedure different from the current procedure under execution;

deciding means responsive to an output of said first comparing means for deciding whether or not a data transfer should be performed for a register window between the register file and the first memory; and first transfer means responsive to a decision of said deciding means for performing the data transfer for all registers in said register window between said register file and said first memory.

2. The processor as set forth in claim 1, wherein said decoding means further determines whether the supplied instruction is an instruction other than call instruction and return instruction, and said first comparing means is responsive to the output of said decoding means determining that the supplied instruction is an instruction other than call instruction and return instruction.

3. The processor as set forth in claim 2, wherein said deciding means comprises first decision means for deciding that data must be saved from said register file in response to the compared difference of said first comparing means exceeding the predetermined constant.

4. An arithmetic and logic processor having a register file and a first memory, wherein said register file includes a plurality of register windows one assigned to each procedure, and each of the plurality of register windows including a plurality of registers, said processor comprising:

decoding means for decoding a supplied instruction to determine whether the supplied instruction is an instruction requiring a procedure different from a current procedure under execution;

first comparing means for comparing difference between a start address of a register window used by a procedure under execution and a starting address of said register file with a predetermined constant, when said decoding means indicates that the supplied instruction is an instruction other than the instruction requiring a procedure different from the current procedure under execution;

deciding means responsive to an output of said first comparing means for deciding whether or not a data transfer should be performed for a register window between the register file and the first memory; and first transfer means responsive to an output of said deciding means for performing the data transfer for all registers in the register window between said register file and said first memory, wherein said first comparing means is activated in response to the output of said decoding means indicating that the supplied instruction is an instruction other than call instruction and return instruction; and said deciding means including first decision means responsive to an output of said first comparing means indicating that the difference is equal to or less than the predetermined constant for deciding that data must be loaded to said register file.

5. The processor as set forth in claim 4, wherein said first decision means comprises:

means for counting a number of words transferred to said register file from said first memory; and second transfer means responsive to the output of said decoding means and output of said means for counting for performing data transfer from said first memory to said register file.

6. An arithmetic and logic processor having a register file with a plurality of register windows, a stack memory and a first memory, each of said plurality of register windows including registers corresponding to a prescribed number of words and one register window being assigned to one procedure, said processor comprising:

decoding means for decoding a supplied instruction to determine whether the supplied instruction is an instruction requiring a procedure different from a current procedure under execution;

first holding means for holding a start address of the register window used by a procedure under execution;

second holding means for holding a bottom address of said register file;

first comparing means for taking a difference of an output of said second holding means and an output of said first holding means, and for comparing the difference with a predetermined constant, when said decoding means indicates that the supplied instruction is an instruction other than the instruction requiring a procedure different from the current procedure under execution;

first deciding means responsive to an output of said first comparing means indicating that the difference is equal to or greater than the predetermined constant, for deciding that contents of said register file must be stored in said stack memory;

first transfer means responsive to an output of said first deciding means for transferring the contents of said register file to said stack memory on a register window unit;

second deciding means responsive to an output of said first comparing means indicating that the difference is equal to or less than the predetermined constant for deciding that data must be transferred from said stack memory to said register file; and second transfer means responsive to the output of said second deciding means for transferring data from said stack memory to said register file on a unit of a register window.

7. The processor as set forth in claim 6, wherein said first comparing means is activated in response to the output of said decoding means indicating that the supplied instruction is an instruction other than call instruction and return instruction.

8. Data processing method in an arithmetic and logic processor having a register file with a plurality of register windows and a first memory, wherein registers corresponding to a predetermined number of words are assigned to each register window, said method comprising the steps of:

decoding a supplied instruction to determine whether the supplied instruction is an instruction requiring a procedure different from a current procedure under execution;

taking a difference between a start address of the register window used by the procedure under execution and a starting address of said register file, and comparing the difference with a predetermined constant, when said decoding means indicates that the supplied instruction is an instruction other than the instruction requiring a procedure different from the current procedure under execution;

in response to a result of the step of comparing, deciding whether or not data transfer should be performed for a register window between said register file and said first memory; and in response to a result of the step of deciding, performing the data transfer for all registers in the register window between said register file and said first memory.

9. The method as set forth in claim 8, wherein said step of comparing is performed when the supplied instruction is an instruction other than call instruction and return instruction.

10. The method as set forth in claim 9, wherein said step of deciding comprises:

a first step of deciding that data transfer must be performed from said register file to said first memory when the comparison result of said step of comparing indicates that the difference is greater than the predetermined constant; and a second step of deciding that data transfer must be performed from said first memory to said register file when the comparison result of said step of comparing indicates that the difference is less than the predetermined constant.

11. Data processing method in an arithmetic and logic processor having a register file with a plurality of register windows and a first memory, wherein registers corresponding to a predetermined number of words are assigned to each register window, said method comprising the steps of:

decoding a supplied instruction to determine whether the supplied instruction is an instruction requiring a procedure different from a current procedure under execution;

taking a difference between a start address of the register window used by the procedure under execution and a starting address of said register file, and comparing the difference with a predetermined constant, when said decoding means indicates that the supplied instruction is an instruction other than the instruction requiring a procedure different from the current procedure under execution;

in response to a result of the step of comparing, deciding whether or not data transfer should be performed for a register window between said register file and said first memory; and in response to a result of the step of deciding, performing the data transfer for all registers in the register window between said register file and said first memory, wherein said step of comparing is performed when the supplied instruction is an instruction other than call instruction and return instruction;

said step of deciding includes:

a first step of deciding that data transfer must be performed from said register file to said first memory when the comparison result of said step of comparing indicates that the difference is greater than the predetermined constant, and a second step of deciding that data transfer must be performed from said first memory to said register file when the comparison result of said step of comparing indicates that the difference is less than the predetermined constant; and the first memory is a stack memory.

12. An operational processing apparatus comprising:

a register file including a plurality of register windows, each of said register windows including a plurality of registers and allotted to a different procedure;

a last-in first-out type memory means;

comparison means for comparing a difference between a start address of a register window allotted to a procedure under execution and a bottom address of said register file with a predetermined reference value, when a supplied instruction is an instruction other than instructions which require a procedure different from said procedure under execution; and means responsive to said comparison means for effecting transfer of data between said register file and said last-in first-out type memory means in parallel with execution of said supplied instruction on a unit of a register window.

13. An operational processing apparatus, comprising:

a register file including a plurality of register windows, each of said register windows including a plurality of registers and allotted to a different procedure;

last-in first-out type memory means;

comparison means for comparing the differences between a start address of a register window allotted to a procedure under execution and a start address of said register file with a predetermined reference value, when a supplied instruction is included in the same procedure as said procedure under execution; and means, responsive to said comparison means indicating that said difference is greater than said predetermined reference value, for transferring contents of all registers in a register window allotted to a procedure least recently executed in said register file to said last-in first-out type memory means.

14. An operational processing apparatus, comprising:

a register file including a plurality of register windows, each register window including a plurality of registers and allotted to a different procedure;

last-in first-out type memory means;

comparison means for comparing the difference between a start address of a register window allotted to a procedure under execution and a start address of said register file with a predetermined reference value, when a supplied instruction utilizes a register window allotted to said procedure under execution; and means responsive to said comparison means indicating that said difference is smaller than said predetermined reference value, for transferring data from said last-in first-out type memory means into all registers in a register window immediately preceding a register window designated by said start address of said register window.

15. An operational processing apparatus comprising:

a register file including a plurality of register windows, each of said register windows including a plurality of registers and allotted to a different procedure;

last-in first-out type memory means;

decode means for decoding a supplied instruction of a fixed bit length which includes an operand code and source and destination addresses respectively indicating registers in said register file as a data source and a data destination to determine whether the supplied instruction is an instruction requiring a procedure different from a current procedure under execution;

comparison means responsive to said decode means determining that said supplied instruction is included in said procedure under execution and said source and destination addresses designate registers included in the register window allotted to said procedure under execution, for comparing the difference between a start address of the register window allotted to said procedure under execution and a bottom address of said register file with a predetermined reference value;

determination means responsive to an output of said comparison means for determining whether transfer of data should be effected between said register file and said register file; and transfer control means responsive to a determination of said determination means, for transferring data between a register window different from said register window allotted to said procedure under execution and said last-in first-out type memory means in a unit of register window.

* * * * *